US010477572B2

(12) United States Patent
Sun et al.

(10) Patent No.: US 10,477,572 B2
(45) Date of Patent: Nov. 12, 2019

(54) REITERATED DOWNLINK GRANT DESIGN FOR MULTIPLE TRANSMISSION TIME INTERVAL GRANT SUPPORT IN ECC

(71) Applicant: QUALCOMM Incorporated, San Diego, CA (US)

(72) Inventors: Jing Sun, San Diego, CA (US); Tao Luo, San Diego, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 15/207,870

(22) Filed: Jul. 12, 2016

(65) Prior Publication Data

US 2017/0048886 A1 Feb. 16, 2017

Related U.S. Application Data

(60) Provisional application No. 62/205,537, filed on Aug. 14, 2015.

(51) Int. Cl.
*H04W 72/14* (2009.01)
*H04L 5/00* (2006.01)
(Continued)

(52) U.S. Cl.
CPC ........... *H04W 72/14* (2013.01); *H04L 1/1812* (2013.01); *H04L 5/0053* (2013.01);
(Continued)

(58) Field of Classification Search
CPC .............................. H04W 72/14; H04L 1/1812
See application file for complete search history.

(56) References Cited

U.S. PATENT DOCUMENTS

2013/0114492 A1* 5/2013 Liu ....................... H04L 1/0061
370/312
2014/0177487 A1* 6/2014 Hammarwall ...... H04W 72/042
370/280
(Continued)

FOREIGN PATENT DOCUMENTS

WO WO-2014098701 A1 6/2014

OTHER PUBLICATIONS

IPEA/EP, Written Opinion of the International Preliminary Examining Authority, Int'l Application No. PCT/US2016/042132, dated Sep. 21, 2016, 13 pgs., European Patent Office, Munich, DE.
(Continued)

*Primary Examiner* — Zhensheng Zhang
(74) *Attorney, Agent, or Firm* — Holland & Hart LLP

(57) ABSTRACT

Enhanced robustness for downlink burst transmissions using reiterated grants. A user equipment (UE) may receive multiple transmissions during multiple (e.g., consecutive, etc.) transmission time intervals (TTIs) as part of a downlink burst from a base station, where at least some of the TTIs may include an iteration of a grant and a data transmission. The grants may contain some common control information for TTIs of the downlink burst, as well as an indicator of how may TTIs come before and after. The UE may identify preceding and subsequent TTIs in the downlink burst by decoding any of the grant iterations. If the UE identifies a previous transmission that has not been buffered, it may send a negative acknowledgement to the base station. If the previous transmission has been buffered, the UE may decode the previous transmission based at least in part on the current grant iteration.

26 Claims, 16 Drawing Sheets

(51) Int. Cl.
*H04L 1/18* (2006.01)
*H04W 72/04* (2009.01)

(52) U.S. Cl.
CPC .......... *H04L 5/0055* (2013.01); *H04L 5/0091* (2013.01); *H04W 72/0446* (2013.01); *H04L 5/001* (2013.01)

(56) References Cited

U.S. PATENT DOCUMENTS

| | | | |
|---|---|---|---|
| 2014/0328260 A1 | 11/2014 | Papasakellariou et al. | |
| 2016/0262101 A1* | 9/2016 | Nammi | H04W 72/0446 |
| 2017/0251465 A1* | 8/2017 | Andersson | H04W 72/0446 |

OTHER PUBLICATIONS

Mac Rapporteurs Qualcomm Europe et al: "36.321 CR covering agreements of RAN2 #61bis," R2-082503, Kansas City, USA, Apr. 29, 2008, 32 pages, vol. RAN WG2, No. XP050140184, E-UTRA Mac Protocol Specification Update, Mobile Competence Centre, 650, Route Des Lucioles, F-06921 Sophia-Antipolis Cedex, France, 3rd Generation Partnership Project (3GPP).

* cited by examiner

REITERATED DOWNLINK GRANT DESIGN FOR MULTIPLE TRANSMISSION TIME INTERVAL GRANT SUPPORT IN ECC

CROSS REFERENCES

The present application for patent claims priority to U.S. Provisional Patent Application No. 62/205,537 by Sun et al., entitled "Reiterated Downlink Grant Design for Multiple Transmission Time Interval Grant Support In ECC," filed Aug. 14, 2015, assigned to the assignee hereof, and expressly incorporated by reference herein for any and all purposes.

BACKGROUND

The following relates generally to wireless communication, and more specifically to downlink grant design for multiple transmission time interval (TTI) grant support in an enhanced component carrier (eCC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a base station may have multiple data transmissions to schedule to the same UE. The base station may schedule each data transmission in a corresponding TTI, and each data transmission may be associated with a unique hybrid automatic repeat request (HARQ) process for error correction. Transmitting multiple data transmissions associated with different HARQ processes may result in a significant amount of signaling overhead, and decoding error for control information associated with different data transmissions may result in unnecessary re-transmissions of data.

SUMMARY

In some cases, a base station and a user equipment (UE) may communicate via one or more grouped transmissions. For example, a UE may receive a set of grouped transmissions during a number of transmission time intervals (TTIs) as part of a downlink (DL) burst from a base station, where at least some of the TTIs may include both an iteration of a grant and a data transmission. The grants may contain at least some common control information associated with TTIs of the DL burst (e.g., a common MCS, transport block size, etc.), as well as an indicator of how may TTIs come before and after the particular grant. Thus, the UE may identify preceding and subsequent transmissions in the DL burst by decoding any of the grant iterations. If the UE identifies a previous transmission that has not been buffered, it may send a negative acknowledgement to the base station. If the previous transmission has been buffered, the UE may decode the previous transmission based at least in part on the current grant iteration.

A method of wireless communication is described. The method may include receiving a first grant and a first data transmission during a first of a plurality of transmission time intervals of a downlink burst, the first grant comprising control information for each of the plurality of TTIs of the downlink burst, receiving a second data transmission during a second of the plurality of transmission time intervals, and decoding the first data transmission and the second data transmission based at least in part on decoding the first grant.

An apparatus for wireless communication is described. The apparatus may include means for receiving a first grant and a first data transmission during a first of a plurality of transmission time intervals of a downlink burst, the first grant comprising control information for each of the plurality of TTIs of the downlink burst, means for receiving a second data transmission during a second of the plurality of transmission time intervals, and means for decoding the first data transmission and the second data transmission based at least in part on decoding the first grant.

A further apparatus for wireless communication is described. The apparatus may include a processor, memory in electronic communication with the processor, and instructions stored in the memory and operable, when executed by the processor, to cause the apparatus to receive a first grant and a first data transmission during a first of a plurality of transmission time intervals of a downlink burst, the first grant comprising control information for each of the plurality of transmission time intervals, receive a second data transmission during a second of the plurality of transmission time intervals of the downlink burst, and decode the first data transmission and the second data transmission based at least in part on decoding the first grant.

A non-transitory computer-readable medium storing code for wireless communication is described. The code may include instructions executable to receive a first grant and a first data transmission during a first of a plurality of transmission time intervals of a downlink burst, the first grant comprising control information for each of the plurality of transmission time intervals of the downlink burst, receive a second data transmission during a second of the plurality of transmission time intervals of the downlink burst, and decode the first data transmission and the second data transmission based at least in part on decoding the first grant.

Some examples of the method, apparatuses, or non-transitory computer-readable medium described herein may further include processes, features, means, or instructions for identifying a number of preceding transmission time intervals and a number of subsequent transmission time intervals in the downlink burst based at least in part on the decoding of the first grant. In some examples the decoding the first data transmission and the second data transmission comprises decoding data symbols of the second data transmission stored in a buffer based at least in part on the first grant. Additionally or alternatively, some examples may include processes, features, means, or instructions for determining that a preceding one of the plurality of transmission time intervals has not been decoded based at least in part on the number of preceding transmission time intervals, and transmitting a negative acknowledgement (NACK) corresponding to the preceding transmission time interval.

Some examples of the method, apparatuses, or non-transitory computer-readable medium described herein may further include processes, features, means, or instructions for receiving a second grant during the second transmission time interval, performing a cyclic redundancy check (CRC) on the second grant, and determining that the second grant has not been decoded successfully based at least in part on the CRC.

Some examples of the method, apparatuses, or non-transitory computer-readable medium described herein may further include processes, features, means, or instructions for identifying a nominal number of control symbols for the downlink burst, and determining a partial transport block size of the first data transmission and the second data transmission based at least in part on a number of transmission time intervals of the downlink burst and the nominal number of control symbols. Additionally or alternatively, some examples may include processes, features, means, or instructions for determining a number of control symbols for the first data transmission or the second data transmission, the number of control symbols being different from the nominal number of control symbols, and rate matching the first data transmission or the second data transmission based at least in part on the number of control symbols.

In some examples of the method, apparatuses, or non-transitory computer-readable medium described herein, the plurality of transmission time intervals are consecutive and each have a same transmission time interval length. In some examples, a grant is included in each transmission time interval of the downlink burst. In some examples, at least one transmission time interval of the downlink burst does not include a grant.

In some examples of the method, apparatuses, or non-transitory computer-readable medium described herein, each transmission time interval of the downlink burst comprises a plurality of subframes. In some examples, each transmission time interval of the downlink burst is associated with a same hybrid automatic repeat request process.

In some examples of the method, apparatuses, or non-transitory computer-readable medium described herein, the control information comprises modulation and coding scheme information, rank information, a precoding matrix indicator, a resource location, or any combination thereof.

A method of wireless communication is described. The method may include identifying a plurality of transmission time intervals for a downlink burst, transmitting a first grant and a first data transmission during a first of the plurality of transmission time intervals, the first grant comprising control information for each of the TTIs of the downlink burst, and transmitting a second data transmission during a second of the plurality of transmission time intervals.

An apparatus for wireless communication is described. The apparatus may include means for identifying a plurality of transmission time intervals for a downlink burst, means for transmitting a first grant and a first data transmission during a first of the plurality of transmission time intervals, the first grant comprising control information for each of the plurality of TTIs of the downlink burst, and means for transmitting a second data transmission during a second of the plurality of transmission time intervals.

A further apparatus for wireless communication is described. The apparatus may include a processor, memory in electronic communication with the processor, and instructions stored in the memory and operable, when executed by the processor, to cause the apparatus to identify a plurality of transmission time intervals for a downlink burst, transmit a first grant and a first data transmission during a first of the plurality of transmission time intervals, the first grant comprising control information for each of the plurality of TTIs of the downlink burst, and transmit a second data transmission during a second of the plurality of transmission time intervals.

A non-transitory computer-readable medium storing code for wireless communication is described. The code may include instructions executable to identify a plurality of transmission time intervals for a downlink burst, transmit a first grant and a first data transmission during a first of the plurality of transmission time intervals, the first grant comprising control information for each of the plurality of TTIs of the downlink burst, and transmit a second data transmission during a second of the plurality of transmission time intervals.

In some examples of the method, apparatuses, or non-transitory computer-readable medium described herein, the first grant and the second grant each comprise an indication of a number of preceding transmission time intervals and a number of subsequent transmission time intervals in the downlink burst. Some examples may include processes, features, means, or instructions for identifying a partial transport block group size based at least in part on a nominal number of control symbols, determining that a set of resources for a code block retransmission overlaps multiple transmission time intervals based at least in part on the partial transport block group size, adjusting the partial transport block group size based at least in part on the determination, and transmitting the code block retransmission within a single transmission time interval based at least in part on the adjusted partial transport block group size.

In some examples of the method, apparatuses, or non-transitory computer-readable medium described herein, the plurality of transmission time intervals are consecutive and each have a same transmission time interval length. Additionally or alternatively, in some examples a grant and a data transmission is included in each of the plurality of transmission time intervals of the downlink burst. Additionally or alternatively, in some examples a grant is included in fewer than all transmission time intervals of the downlink burst.

In some examples of the method, apparatuses, or non-transitory computer-readable medium described herein, each of the plurality of transmission time intervals of the downlink burst comprises a plurality of subframes. In some examples the plurality of subframes have a first subframe duration that is shorter than a second subframe duration, wherein the first subframe duration and the second subframe duration are supported by a same wireless network.

In some examples of the method, apparatuses, or non-transitory computer-readable medium described herein, each data transmission of the set of transmission time intervals of the downlink burst is associated with a same hybrid automatic repeat request process.

DETAILED DESCRIPTION

Techniques for enhancing reception of multiple transmissions sent in downlink (DL) bursts using reiterated grants are disclosed. The multiple transmissions may be sent in a set of transmission time intervals (TTIs) over a carrier, which may be a component carrier (CC) or an enhanced component carrier (eCC) operating in unlicensed or shared spectrum. The transmissions may share one or more common transmission characteristics (e.g., common resource block assignments, common modulation and coding scheme (MCS), common rank, common precoding, etc.). In some cases, at least some TTIs in a DL burst may include a reiterated DL grant that includes common control information for decoding data transmissions in TTIs of the DL burst. In some cases, the DL burst techniques may reduce the number of hybrid automatic repeat request (HARQ) processes used for transmission. For example, a single HARQ process may be used for multiple transmissions sent in a DL burst, in some cases.

Each grant for the DL burst may include an indicator used to identify the number of preceding and subsequent transmissions (e.g., TTIs) within the burst. For example, if the first transmitted grant for the DL burst (e.g., transmitted in the first TTI of the DL burst) is received and decoded without error, then the UE may identify complete control information for receiving and decoding transmissions for each TTI of the DL burst. In some cases, the UE may not decode the first transmitted grant without error. That is, while the UE may be monitoring a control channel for grants and the modulated symbols for the first transmitted grant may be received at the UE (e.g., via an antenna and/or receiver), the UE may be unable to decode the grant (e.g., a cyclic redundancy check (CRC) may fail for the first transmitted grant, etc.). However, the UE may use the indicator of a correctly decoded subsequent grant to identify previous TTIs included in the DL burst. If a data transmission included in a previous TTI is buffered then the UE may identify and decode the data transmission included in the previous TTI of the DL burst. Alternatively, if the data transmission included in the previous TTI is not buffered, the UE may transmit one or more indications that a transmission was not received (e.g., a negative acknowledgement (NACK)) to the base station to request retransmission of the data transmission in the TTI that the UE is not able to recover.

Aspects of the disclosure are initially described in the context of a wireless communication system. Specific examples are then described for multiple iterations of a downlink grant using multiple TTIs in a DL burst. Aspects of the disclosure are further illustrated by and described with reference to apparatus diagrams, system diagrams, and flowcharts that relate to reiterated downlink grant design for multiple TTI grants.

Figure 1:
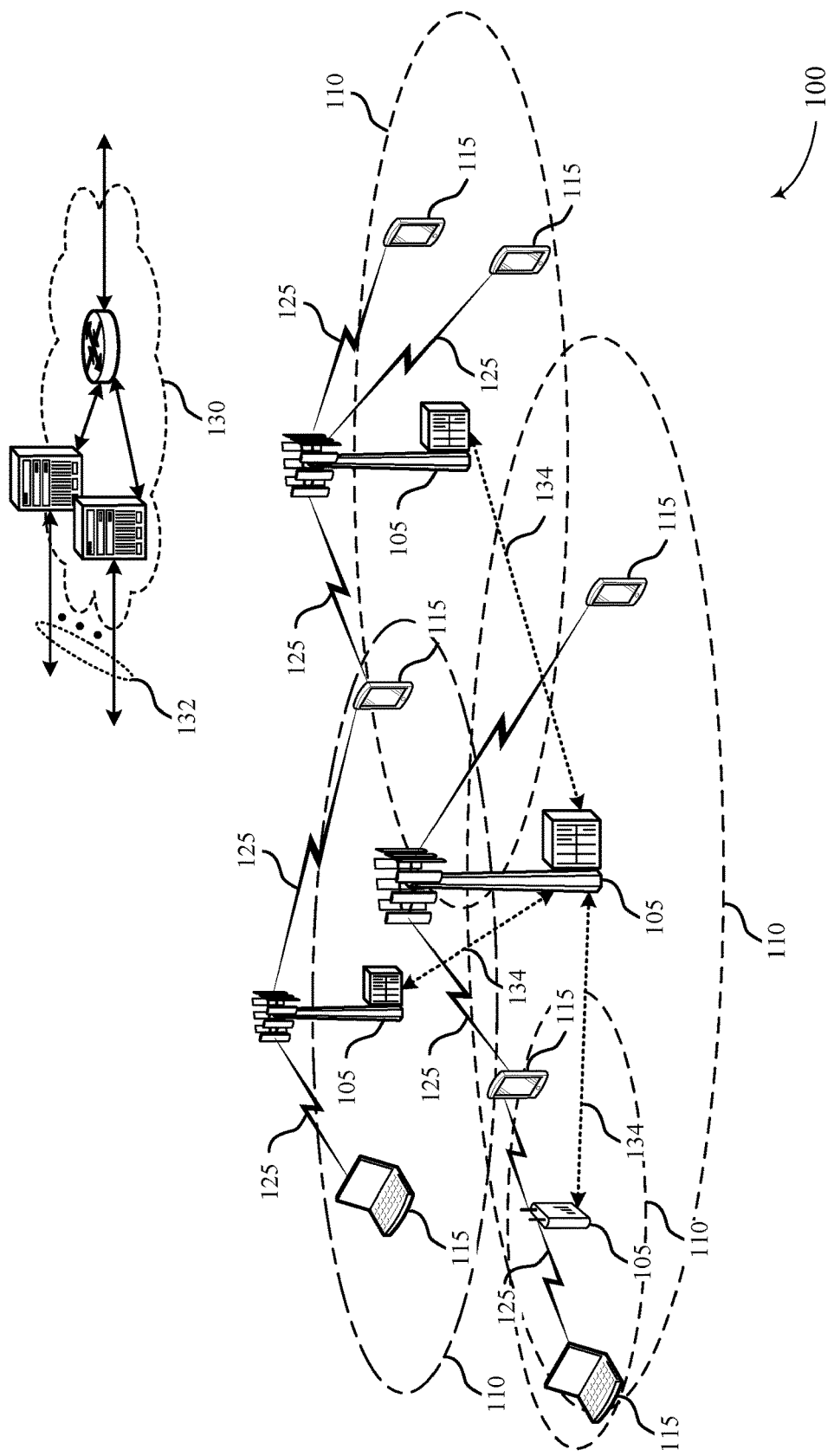
FIG. 1 illustrates an example of a wireless communications system that supports reiterated downlink grant design for multiple TTI grant support in eCC in accordance with aspects of the present disclosure.

FIG. 1 illustrates an example of a wireless communications system 100 in accordance with various aspects of the present disclosure. The wireless communications system 100 includes base station 105, UEs 115, and a core network 130. In some examples, the wireless communications system 100 may be a LTE/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

HARQ may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information. In some cases, a single HARQ process may be used for each TTI in a DL burst.

A UE 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

A control channel (e.g., physical downlink control channel (PDCCH), etc.) of a carrier such as an eCC generally carries downlink control information (DCI) messages such as DL grants, UL grants, and other information. DL grants for single TTI transmissions generally dynamically allocate resources for a transmission in the same TTI as the DL grant. Each DL grant associated with a single TTI DL transmission includes information such as a resource assignment (e.g., resource blocks (RBs) assigned for the DL transmission), MCS, redundancy information, and other information. The size and format of DCI messages such as DL grants can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI message size and format depend on the amount of information as well as factors such as bandwidth, the number of antenna ports, and duplexing mode.

A PDCCH can carry DCI messages associated with multiple users, and each UE 115 may decode the DCI messages that are intended for it. For example, each UE 115 may be assigned a C-RNTI and CRC bits attached to each DCI may be scrambled based at least in part on the C-RNTI. To reduce power consumption and overhead at the user equipment, a limited set of locations can be specified for DCI messages associated with a specific UE 115. Potential locations may be separated by aggregation size (e.g., groups of 1, 2, 4 and 8 control channel elements (CCEs) in size), and a set of CCE locations in which the user equipment may find relevant DCI messages may be specified. These locations may be known as a search space. The search space can be partitioned into two regions: a common search space and a UE-specific (dedicated) search space. The common search space may be monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space may depend on the C-RNTI, the subframe index, the CCE aggregation level and a random seed. A UE 115 may attempt to decode DCI messages by performing a process known as a blind decode, during which decode attempts are performed on the search spaces until a valid DCI message is detected. During a blind decode, the UE 115 may attempt to descramble and decode (e.g., perform CRC) on all potential DCI messages using its C-RNTI, and a correctly decoded DCI message (e.g., CRC passes) is determined to include DCI for the UE 115.

In some cases, a wireless communications system may utilize one or more eCCs. An eCC may be characterized by one or more features including: flexible bandwidth, variable length TTIs, and modified control channel configuration. In some cases, an eCC may be associated with a carrier aggregation configuration or a dual connectivity configuration (e.g., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a variable TTI length, which may include use of a reduced or variable symbol duration. In some cases the symbol duration may remain the same, but each symbol may represent a distinct TTI. In some cases an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an eCC may utilize modified DL control information messages which may be termed enhanced PDCCH (ePDCCH) messages). For example, one or more control channels of an eCC may utilize FDM scheduling to accommodate flexible bandwidth use. Other control channel modifications include the use of additional control channels (e.g., for eMBMS scheduling, or to indicate the length of variable length UL and DL bursts), or control channels transmitted at different intervals. An eCC may also include modified or additional HARQ related control information.

In some cases, a base station 105 may have multiple data transmissions to schedule to the same UE 115. The base station may schedule each data transmission in a corresponding TTI, and each data transmission may be associated with a unique hybrid automatic repeat request HARQ process for error correction. Transmitting multiple data transmissions associated with different HARQ processes may result in a significant amount of signaling overhead, and decoding error for control information associated with different data transmissions may result in excessive re-transmissions of data. For example, in unlicensed or shared spectrum, a UE 115 may not be able to rely on consistent timing of multiple HARQ processes, so when using a burst the decoding error of control channel transmissions may cause unnecessary re-transmission.

The components of wireless communications system 100, including the base stations 105 and UEs 115, may be configured for enhancing reception of multiple transmissions sent in DL bursts using reiterated grants. In some examples, each TTI of a DL burst may include a data transmission and a reiterated grant including common control information for reception of each data transmission in each TTI of the DL burst, as well as an indicator of how may TTIs come before and after. In other examples, one or more TTIs of a DL burst may not include a reiterated grant and those TTIs may be decoded using a reiterated grant from a different TTI of the DL burst that has a grant. Thus, the UE 115 may identify the current, preceding, and subsequent data transmissions in TTIs of the DL burst by decoding any of the grant iterations. If the UE 115 identifies a previous data transmission that has not been buffered, it may send a negative acknowledgement to the base station. If the previous data transmission has been buffered, the UE 115 may decode the previous transmission based at least in part on the current grant iteration.

Figure 2:
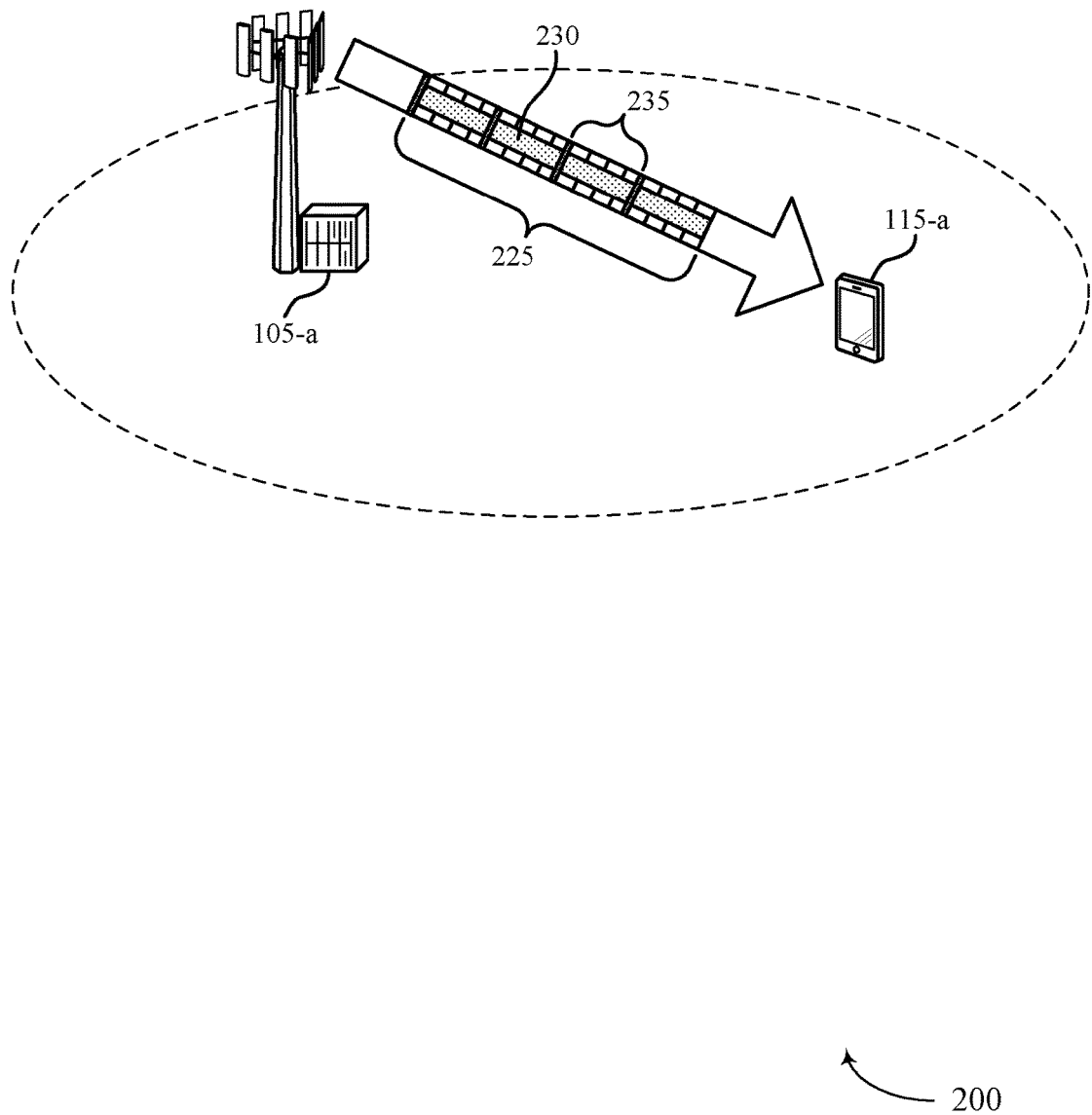
FIG. 2 illustrates an example of a wireless communications subsystem that supports reiterated downlink grant design for multiple TTI grant support in eCC in accordance with aspects of the present disclosure.

FIG. 2 illustrates an example of a wireless communications subsystem 200 for enhanced multiple TTI grant support in eCC using reiterated grants in accordance with various aspects of the present disclosure. Wireless communications subsystem 200 may include base station 105-a and UE 115-a, which may be examples of the corresponding devices described with reference to FIG. 1. Wireless communications subsystem 200 may support the transmission of DL bursts including multiple transmissions over multiple TTIs, where at least some of the TTIs include an iteration of a grant for the DL burst.

In wireless communications subsystem 200, base station 105-a and UE 115-a may communicate over a radio frequency spectrum band using different types of component carriers (CCs) or enhanced component carriers (eCCs). CCs and/or eCCs may be used concurrently in a carrier aggregation configuration and communication may be in unlicensed frequency bands (e.g., radio frequency spectrum bands where devices may contend for access), shared frequency bands (licensed to multiple operators), or licensed frequency bands (e.g., radio frequency spectrum bands licensed for particular operators and/or uses). Base station 105-a may transmit a carrier transmission 225. The carrier transmission 225 may include one or more DL bursts 230. Each DL burst 230 may include multiple data transmissions to a UE 115 over multiple TTIs 235 (e.g., subframes or sets of subframes) that may have the same or variable length. The multiple TTIs may be consecutive. In some cases, each DL burst 230 may be associated with a single HARQ response message from the UE 115-a, which may include code block level acknowledgment/negative acknowledgment (ACK/NACK) support. For example, a single DL burst 230 may include multiple transmissions over a corresponding set of TTIs 235, and each transmission may include one or more code blocks, where each code block may be independently decodable (e.g., have separate FEC information, etc.). The UE 115-a may receive and attempt to decode each code block, providing one HARQ message in response to the DL burst with multiple ACK/NACK bits associated with each respective code block of the DL burst.

In some wireless communications systems using eCCs, a subframe may be used as the primary unit in the DL frame structure, where each subframe may have a relatively short duration (e.g., 200 μs, as compared to 1 ms). A TTI 235 may therefore be formed by a set of subframes, such as 1, 2, 4, or 8 subframes, for example. The total length of the TTI 235 may be indicated at the beginning of the TTI 235. Each TTI 235 may also contain a physical downlink control channel (PDCCH) region for encoded control information, such as DL grants for decoding TTIs of a downlink burst. In some examples, the DL grants included in the TTI may use frequency division multiplexing (FDM).

A cell-specific reference signal (CRS) or a preamble may also be transmitted at the beginning of a DL frame, but may be repeated periodically throughout the DL frame if the frame is relatively long, and the repetition pattern may be signaled in system information blocks. In some cases, a UE 115-a may miss the first preamble in the received signal, but may detect a later preamble and identify the portion of the transmission after the detected preamble. In some cases, it may be beneficial to grant multiple TTIs 235 of the carrier transmission to the same UE 115-a (e.g., to increase data rate or reduce latency, etc.). Using multiple independent transmissions and multiple HARQ processes (e.g., one HARQ for each TTI) may complicate the signaling due to the overhead of each HARQ process.

In some wireless communications systems, a DL burst 230 that includes data transmissions in a number of TTIs 235 (which may be consecutive) may be granted in the same carrier transmission 225 to the same UE 115 by using common parameters for the transmissions. For example, the resource block (RB), modulation and coding scheme (MCS), and rank in each TTI 235 may be the same. In some examples, the TTIs 235 may be consecutive in time. Additionally, the TTIs 235 of a DL burst 230 may be of equal length while the TTI length may vary between different portions of a carrier transmission or carrier transmissions including bursts to different UEs 115. In some cases, selection of common parameters for the transmissions of a burst may reduce the amount of data bits needed to describe the grant.

Additionally, each DL burst 230 may be associated with a single HARQ process, and the UE 115 may send a single HARQ response message with ACK/NACK information (e.g., per code block) for the DL burst 230, resulting in a reduction in the total number of HARQ processes used. Reducing the number of HARQ processes may reduce control overhead associated with transmissions. For example, there may be a smaller number of data bits in different control channels (e.g., PDCCH, PUCCH, etc.) to identify the HARQ process. This may result in reduced processing complexity at the UE 115. In some examples, one HARQ process may be sufficient, but two may be used.

A base station 105-a may transmit a grant to UE 115-a that includes certain control information common to each TTI in a DL burst 230 (e.g., MCS, rank, precoding matrix indicator (PMI), etc.) including transmissions in K TTIs. The TTIs may be consecutive. For example, the consecutive TTIs 235 may follow the sequence N, N+1, . . . , N+K−1, where the TTIs 235 may each be the same length. A DL grant may be reiterated K times with one grant in each of the K TTIs. Each iteration of a grant may be individually decodable and may contain the common control information (e.g., RB, MCS, PMI, etc.) which may be the same across all of the K TTIs. In some examples, the grant in TTI n may contain information about the number of TTIs before and after TTI n that may also be included in the grant. In some cases, this indication may be different between multiple iterations of the grant. For example, the first iteration of the grant may have no TTIs before and K−1 TTIs after while the third iteration of the grant may have two TTIs before and K−3 TTIs after. In some examples, it may be sufficient for the receiver to decode one of the iterations of the grant to obtain all the information needed to identify and decode each data transmission of the DL burst 230.

The indicator that provides the before and after information may be encoded using the notation (A, B), where A indicates the number of TTIs before and B indicates the number of TTIs after. The possible combinations of (A, B) given the number of TTIs to jointly grant are illustrated in the following examples. For instance, if one grant is included, (0,0) may indicate that the present TTI may be the only choice for a grant. Similarly, if two TTIs are used for the grant, (1,0) and (0,1) may be the corresponding indicators that are used. If three TTIs are used for grants, the choices for encoded indicators may be (2,0), (1,1), and (0,2). In general, the choices possible for K transmissions of the grant may be represented as: (K−1,0), (K−2,1), . . . , (1, K−2), (0, K−1). That is, to support up to K transmissions, there may be 1+2+ . . . +K=K*(K+1)/2 combinations and ceil(log 2(K*(K+1))) bits may be needed. As an example, with four bits, support may be allowed for up to five TTIs (e.g., 15 combinations). Similarly, with five bits, support may be available for up to seven TTIs (e.g., 28 combinations). In one example, each TTI may be eight subframes of 200 μs each, totaling 1.6 ms. Thus, five TTIs may be bundled together (e.g., with a total length of 8 ms) and the base station may assign the entire time duration to one UE 115-a. Although this discussion uses certain illustrative numbers, any number of TTIs, transmissions, and bits may be used.

In some cases, base station 105-*a* and UE 115-*a* may implement techniques for implementing a dynamic transport block size within DL bursts while minimizing the amount of control signaling. For example, in wireless communications systems supporting eCCs, the TB Group (TBG) size for a group of transmissions may be implied by the control information, such as MCS, rank, RB, etc. For a DL burst transmission, the number of data OFDM symbols to be transmitted in future TTIs may not be known. For example, the number of OFDM symbols may be provided in an indicator channel (e.g., Physical Control Format Indicator Channel (PCFICH)) in each TTI and may not be known ahead of time. Therefore, prior to receiving all of the TTIs 235 in the grant, or in some cases, before receiving the indicator channel in the TTIs 235, the UE 115-*a* may not know how many data OFDM symbols there are in the DL burst 230. In this case, the UE 115-*a* may not be able to calculate the TBG size for the DL burst 230 before the end of the burst, which may delay the decoding process.

In some examples, a nominal or predetermined number of control resources (e.g., OFDM symbols or resource elements (REs), etc.) may be used for calculation of a partial TBG size for each TTI of the DL burst 230. As an example, a nominal number of two control OFDM symbols may be assumed for partial TBG size calculation, though this may not be the true number of OFDM symbols used for control information. An estimated TBG size may be determined as the sum of the partial TBG sizes over the TTIs of the DL burst 230. The estimated TBG size may be used, for example, in performing code block segmentation/desegmentation of the transport blocks for the DL burst 230. Rate matching may be performed for each transmission of the DL burst using the actual number of control resources for the TTI (e.g., determined from the PCFICH or PTFICH, etc.). In some cases, code block segmentation is performed for the transport block of the DL burst 230 such that one code block does not span multiple TTIs of the DL burst 230.

In some examples, the first iteration of a grant for the DL burst 230 may be received, but the UE 115-*a* may not receive a later iteration of the grant. In this case, there may be no effect on communications because the first grant iteration may contain all of the necessary grant information. However, there may also be cases where the first iteration of the grant is not successfully decoded (e.g., CRC fail, etc.), but the UE 115-*a* successfully decodes a later iteration of the grant. If the previously received samples of the TTI are not buffered, the UE 115-*a* may not be able to decode the information included in the earlier TTIs. However, the UE 115-*a* may still attempt to decode data transmission of any current and future TTIs because the UE 115-*a* may have complete information on which code blocks (CBs) are contained in the TTIs that were not received. Accordingly, the UE 115-*a* may transmit NACKs for the CBs in the TTIs that were not received. In some cases, the UE 115-*a* may also make a request for a retransmission including an initial redundancy version (RV0) for transmissions which are not recovered. In another example, if the previously received TTI samples are buffered, the UE 115-*a* may access the buffered data and decode the previous TTIs.

Figure 3A:
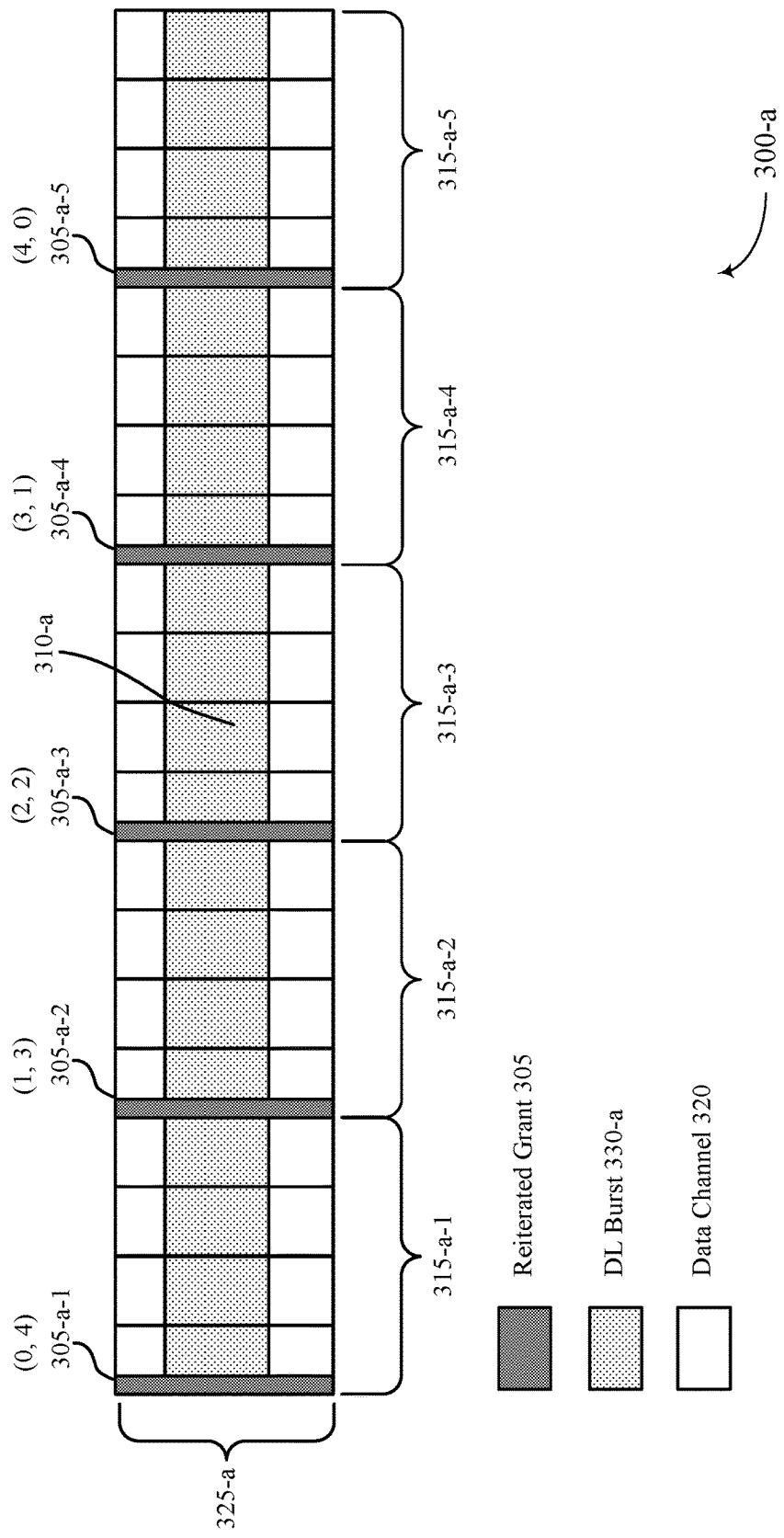
FIGS. 3A-B illustrate examples of a downlink burst that supports reiterated downlink grant design for multiple TTI grant support in eCC in accordance with aspects of the present disclosure.

FIG. 3A illustrates an example diagram 300-*a* of a carrier transmission that supports reiterated downlink grant design for multiple TTI grant support in eCC. Diagram 300-*a* may illustrate, for example, a portion (e.g., a subset of TTIs) of a carrier transmission 325-*a*. In some cases, carrier transmission 325-*a* may represent aspects of techniques performed by a UE 115 or base station 105 as described with reference to FIGS. 1-2. Carrier transmission 325-*a* includes DL burst 330-*a*, which spans multiple TTIs and includes multiple iterations of a DL grant for the DL burst 330-*a*. Although not illustrated, carrier transmission 325-*a* may include other data transmissions or DL bursts in the illustrated TTIs or preceding or subsequent to the illustrated TTIs.

DL burst 330-*a* may correspond to a set of downlink resources composed of five TTIs 315-*a* of carrier transmission 325-*a*. In the example of FIG. 3A, TTIs 315-*a* of the DL burst 330-*a* are consecutive and may be the same duration (e.g., five subframes each). The DL burst 330-*a* may include data transmissions 310-*a* in a data-bearing channel 320 within each TTI 315-*a*. The consecutive TTIs 315-*a* may also each include an iteration of a grant 305-*a* and each grant 305-*a* may include an encoded indicator that provides the number of preceding and subsequent TTIs in the downlink burst.

For example, the first indicator in reiterated grant 305-*a*-1 provides an indication that there are zero TTIs before and four TTIs after the first TTI 315-*a*-1. The second indicator in reiterated grant 305-*a*-2 provides an indication that there is one preceding TTI and three subsequent TTIs in relation to TTI 315-*a*-2. The indicator in reiterated grant 305-*a*-3 provides information that there are two preceding TTIs and two subsequent TTIs in relating to TTI 315-*a*-3, and the fourth indicator in reiterated grant 305-*a*-4 provides information that there are three preceding TTIs and one subsequent TTI in relation to TTI 315-*a*-4. The final indicator in reiterated grant 305-*a*-5 in DL burst 330-*a* provides an indication that there are four preceding TTIs in relating to TTI 315-*a*-5 and none that follow. The encoded indicators may be used by the UE 115 in identifying each of the TTIs 315-*a* associated with the DL burst 330-*a* by decoding any one or more of the grants 305-*a*. For example, the UE may identify that an initial portion of a downlink burst that has not been decoded based at least in part on one of the indicators. As a result, the UE may transmit a NACK for the portion of the burst (e.g., based at least in part on the indicator in the successfully decoded grant of how many previous TTIs were in the burst), which has not been decoded. Thus, the decoding error rate for the grants 305-*a* may be substantially reduced.

In some cases, a second DL burst (not shown) may include retransmissions for some code blocks and initial transmissions for other code blocks (e.g., code blocks having different redundancy versions, etc.). The code block retransmissions may be located at the beginning of the second DL burst (e.g., in the first one or more TTIs), or retransmitted code blocks may be located at the beginning of one or more TTIs. Because the second DL burst may have a different TTI length or the TTIs of the second DL burst may be a different length or have a different number of control symbols, the partial TBG size of a TTI of the second DL burst may be different than the partial TBG size of the first DL burst. Thus, one or more TTIs of the second DL burst may have a partial TBG size corresponding to a non-integer number of code blocks. For example, a first TTI having re-transmissions have a partial TBG size (e.g., based at least in part on the nominal number of control symbols and TTI length of the second DL burst) that fits two code blocks and part of a third code block. Instead of including the partial third code block, the third code block may be delayed to the next TTI and the partial TBG size for the first TTI may be adjusted to remove the partial third code block. Thus, the first TTI will contain only full code blocks and the third code block is wholly included in the second TTI.

Figure 3B:
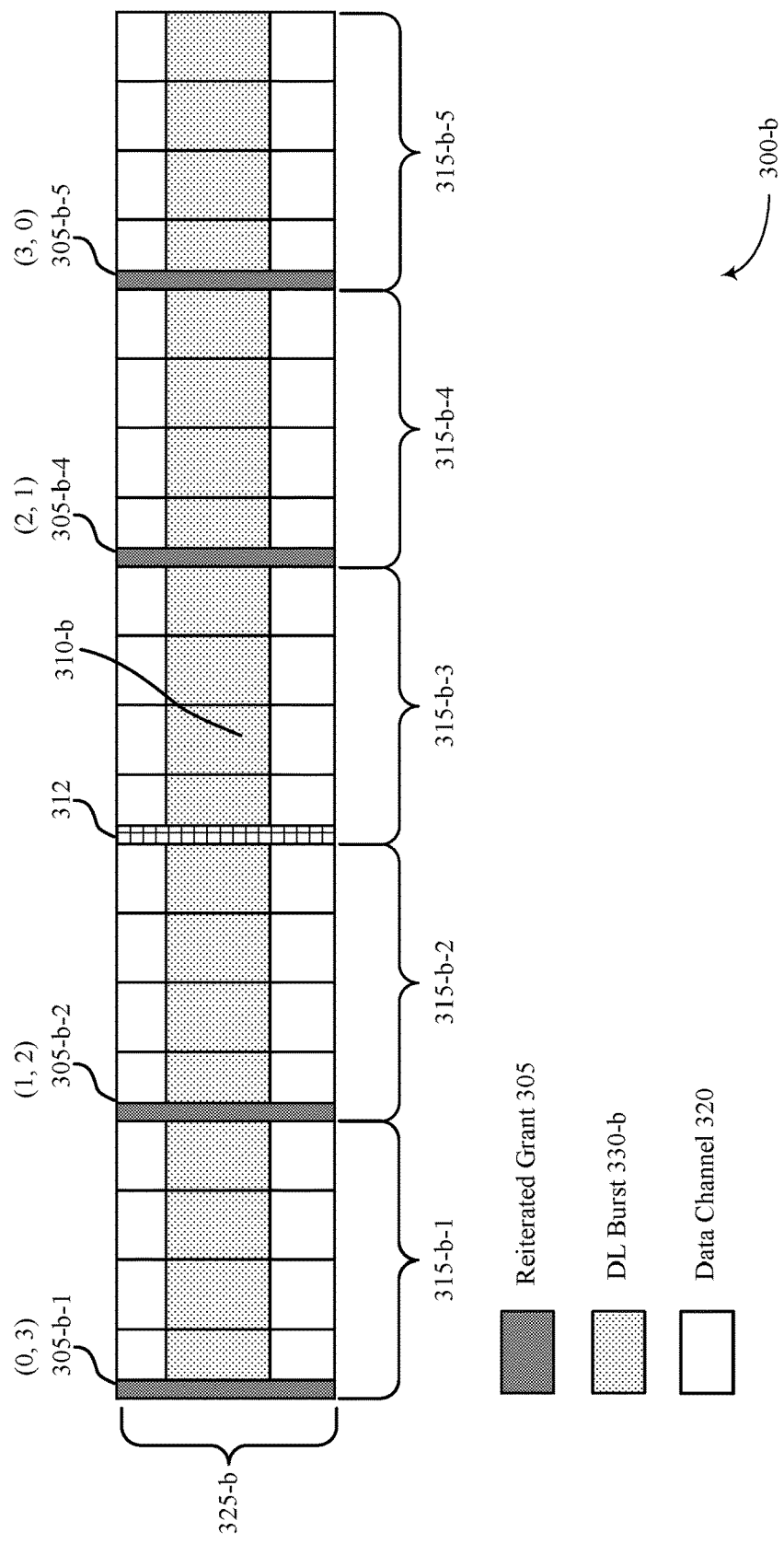

FIG. 3B illustrates an example diagram 300-*b* of a carrier transmission that supports reiterated downlink grant design for multiple TTI grant support in eCC. Diagram 300-*b* may illustrate, for example, a portion (e.g., a subset of TTIs) of a carrier transmission 325-*b*. In the depicted example, carrier transmission 325-*b* includes DL burst 330-*b* that spans five consecutive TTIs 315-*b*.

In the illustrated example, base station 105 may determine not to transmit a grant in one or more TTIs 315-*b* of carrier transmission 325-*b*. In diagram 300-*b*, TTI 315-*b*-3 does not include a grant 305-*b* (see block 312 shaded to represent that TTI 315-*b*-3 does not include a grant). In some examples, the data channel 320 of TTI 315-*b*-3 may have a greater length (as compared to TTIs 315-*b*-1, 315-*b*-2, 315-*b*-3, and 315-*b*-4) because it does not include a grant 305-*b* for DL burst 330-*b* and therefore transport additional data. For example, a number of symbols used for a control channel of TTI 315-*b*-3 may be less than in TTIs 315-*b*-1, 315-*b*-2, 315-*b*-3, and 315-*b*-4. A UE 115 may receive and process the DL burst 330-*b* to determine that a grant was not received in one or more of the TTIs of the DL burst 330-*b* (e.g., TTI 315-*b*-3 does not include a grant). A UE 115 may use any of the other grants 305-*b*-1, 305-*b*-2, 305-*b*-4, and 305-*b*-5 in DL burst 330-*b* to decode TTI 315-*b*-3 and its data transmission 310. In some examples, DL burst 330-*b* may include only a single grant for multiple TTIs. In other examples, DL burst 330-*b* may include multiple grants, but fewer grants than the number of TTIs. For example, DL burst 330-*b* may include at least one grant for every two TTIs.

The DL burst 330-*b* of FIG. 3B also includes an encoded indicator that provides the number of preceding and subsequent TTIs, and accounts for not every TTI having a grant. For example, the first indicator in reiterated grant 305-*b*-1 provides an indication that there are zero TTIs before and three TTIs after the TTI 315-*b*-1. The indicator of grant 305-*b*-2 provides an indication that there is one preceding TTI and two subsequent TTIs in relation to TTI 315-*b*-2. TTI 315-*b*-3 does not have an indicator because it does not have a grant 305-*b*. The indicator for reiterated grant 305-*b*-4 indicates that there are two preceding TTIs and one subsequent TTI relative to TTI 315-*b*-4, and the indicator for reiterated grant 305-*b*-5 provides information that there are three preceding TTIs relative to TTI 315-*b*-5 and none that follow. As in the example of FIG. 3A, the encoded indicators may be used by the UE 115 in identifying each of the TTIs associated with the DL burst 330-*b* by decoding any one or more of the grants 305-*b*.

Figure 4:
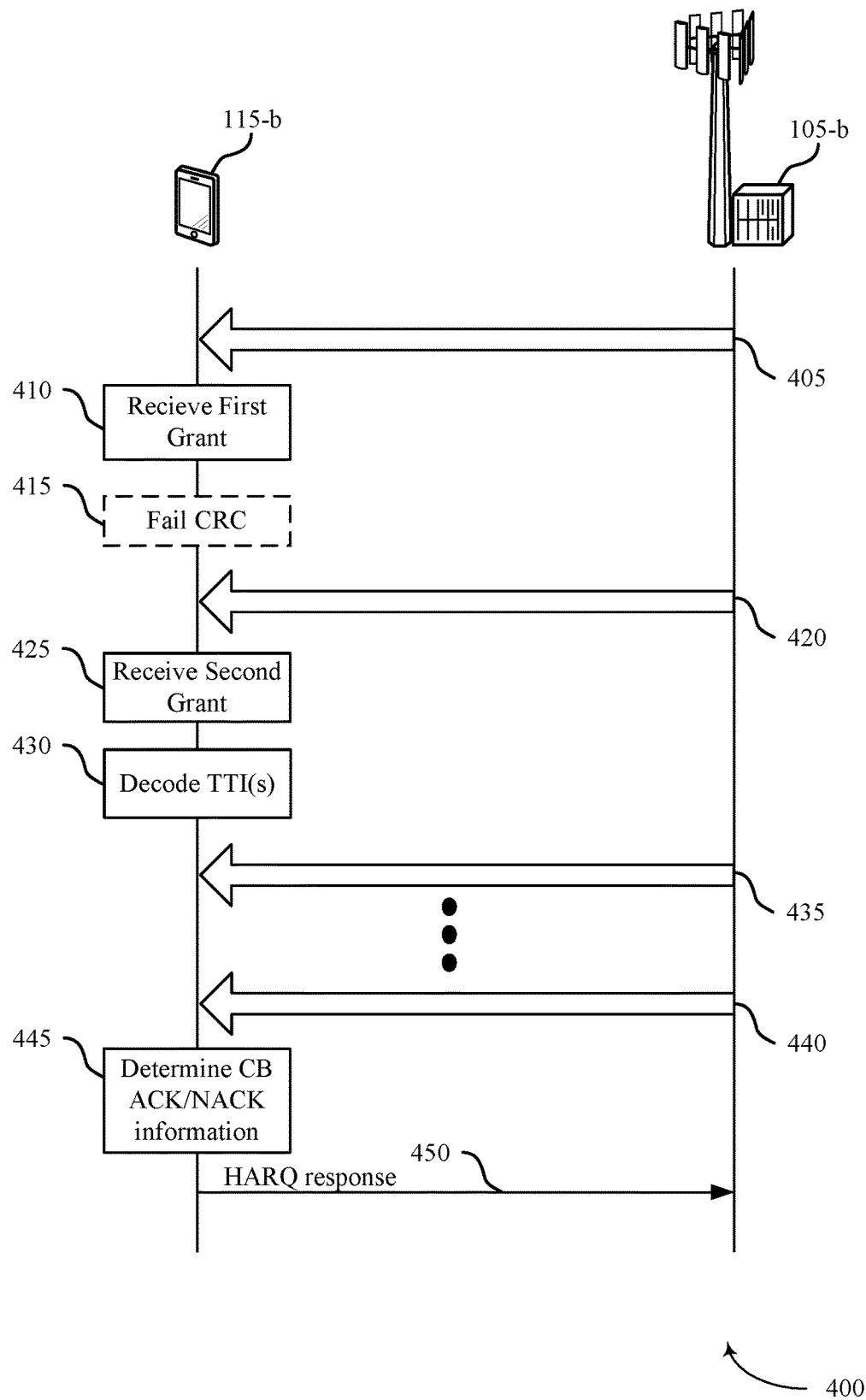
FIG. 4 illustrates an example of a process flow that supports reiterated downlink grant design for multiple TTI grant support in eCC in accordance with aspects of the present disclosure.

FIG. 4 illustrates an example of a process flow 400 that supports reiterated downlink grant design for multiple TTI grant support in eCC in accordance with various aspects of the present disclosure. Process flow 400 may include base station 105-*b* and UE 115-*b*, which may be examples of the corresponding devices described with reference to FIGS. 1-2.

At step 405, base station 105-*b* may identify a set of TTIs for a DL burst and transmit a first grant and data transmission of the DL burst during a first TTI of a carrier transmission. The TTIs may be of the same length and each include a set (e.g., one or more) of subframes. Base station 105-*b* may transmit to UE 115-*b* the portion of the DL burst that includes a first grant and a first data transmission during a first TTI and a second grant and second data transmission during a second TTI of the carrier transmission. In some cases, the first grant and second grant may include the control information for TTIs of the DL burst. The first grant and the second grant may also include an indication of a number of preceding grants and a number of subsequent grants in the DL burst. In some cases, the DL burst is associated with a single HARQ process (e.g., each transmission of the DL burst is associated with the same HARQ process). In some cases, the control information includes MCS information, rank information, PMI, a resource allocation (e.g., assigned RBs for each TTI), or any combination thereof.

At step 410, UE 115-*b* may receive a first grant and a first data transmission included in the first TTI and attempt to decode the first grant. In some cases, at step 415, UE 115-*b* may fail to decode the first grant. That is, UE 115-*b* may perform a cyclic redundancy check on the first grant and determine that the first grant has not been decoded successfully based at least in part on the cyclic redundancy check.

At step 420, UE 115-*b* may receive a second grant and a second data transmission during a second TTI of the downlink burst. In some cases, UE 115-*b* may successfully decode the second grant, which may include common control information as the first grant (e.g., apart from having a different indication of how many preceding and subsequent TTIs are in the burst).

At step 430, UE 115-*b* may decode the first and second data transmission of the first and second TTIs of the DL burst based at least in part on decoding the second grant. In some examples, UE 115-*b* may store the data symbols of the first data transmission in a buffer and decode the buffered data symbols based at least in part on the second received grant. In some examples, UE 115-*b* may identify a nominal number of control symbols for the DL burst and determine a partial TBG size of the first and second data transmission based at least in part on a number of TTIs in the DL burst and the nominal number of control symbols. In some cases, UE 115-*b* may also determine a number of control symbols for the first or second data transmission, where the number of control symbols may be different from the nominal number of control symbols and rate match the first or second data transmission based at least in part on the number of control symbols. In another example, the UE 115-*b* may successfully decode the first grant (or other grant of the DL burst) but not the second grant (e.g., determined by a CRC failure), and the UE 115-*b* may decode the first and second (or other) data transmission of TTIs of the DL burst based at least in part on decoding the first grant (or other grant).

The UE 115-*b* may continue to receive grants and corresponding data transmissions in TTIs of the DL burst and attempt to decode additional grants data transmissions of the DL burst at steps 435, 440.

At 445, the UE 115-*b* may determine ACK/NACK information (e.g., CB-level ACK/NACK) for the DL burst. The UE 115-*b* may transmit a single HARQ response message 450, which may include the ACK/NACK information for the DL burst.

Figure 5:
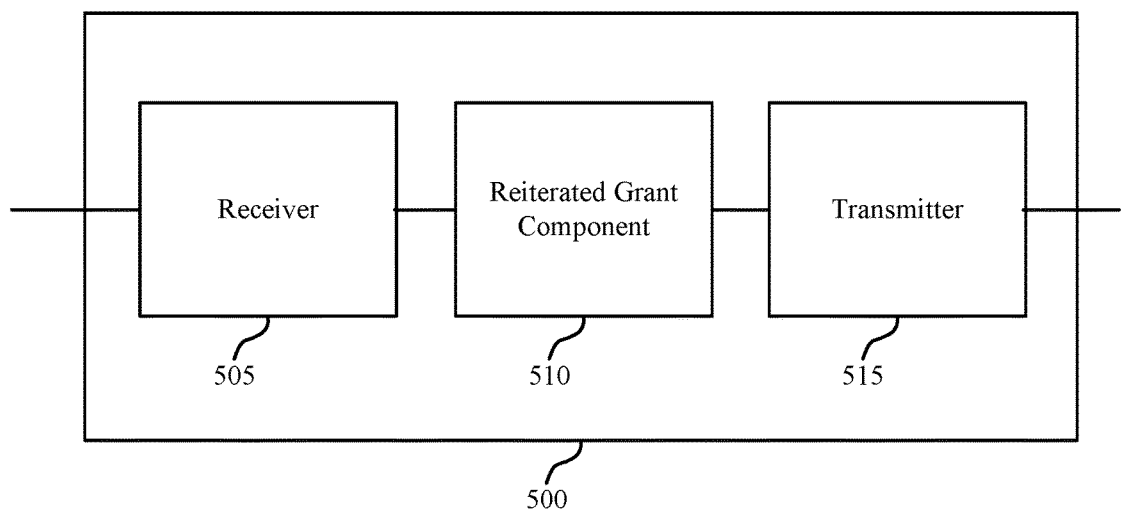
FIGS. 5-7 show diagrams of a wireless device that supports reiterated downlink grant design for multiple TTI grant support in eCC in accordance with aspects of the present disclosure.

FIG. 5 shows a diagram of a wireless device 500 that supports reiterated downlink grant design for multiple TTI grant support in eCC in accordance with various aspects of the present disclosure. The wireless device 500 may be an example of aspects of a UE 115 described with reference to FIGS. 1-4. The wireless device 500 may include receiver 505, reiterated grant component 510, and transmitter 515. The wireless device 500 may also include a processor. Each of these components may be in communication with each other.

The receiver 505 may receive information such as packets, user data, or control information associated with various information channels (e.g., control channels, data channels, and information related to reiterated downlink grant design for multiple TTI grant support in eCC, etc.). Information may be passed on to the reiterated grant component 510, and to other components of wireless device 500.

The reiterated grant component 510 may receive a first grant and a first data transmission during a first TTI of a DL burst (the first grant including control information for multiple TTIs of the DL burst), receive a second grant and a second data transmission during a second TTI of the DL burst (the second grant also including the control information for the multiple TTIs of the DL burst), and decode the first data transmission and the second data transmission based at least in part on decoding the first grant or the second grant. In some cases, each TTI of the downlink burst includes a grant and a data transmission corresponding to the grant. In some cases, each TTI of the downlink burst includes multiple subframes. In some cases, one or more TTIs of the downlink burst may include a data transmission but not a grant corresponding to the DL burst.

The transmitter 515 may transmit signals received from other components of wireless device 500. In some examples, the transmitter 515 may be collocated with the receiver 505 in a transceiver component. The transmitter 515 may include a single antenna, or it may include multiple antennas. In some case, the transmitter 515 may transmit a NACK for the initial portion of the DL burst.

Figure 6:
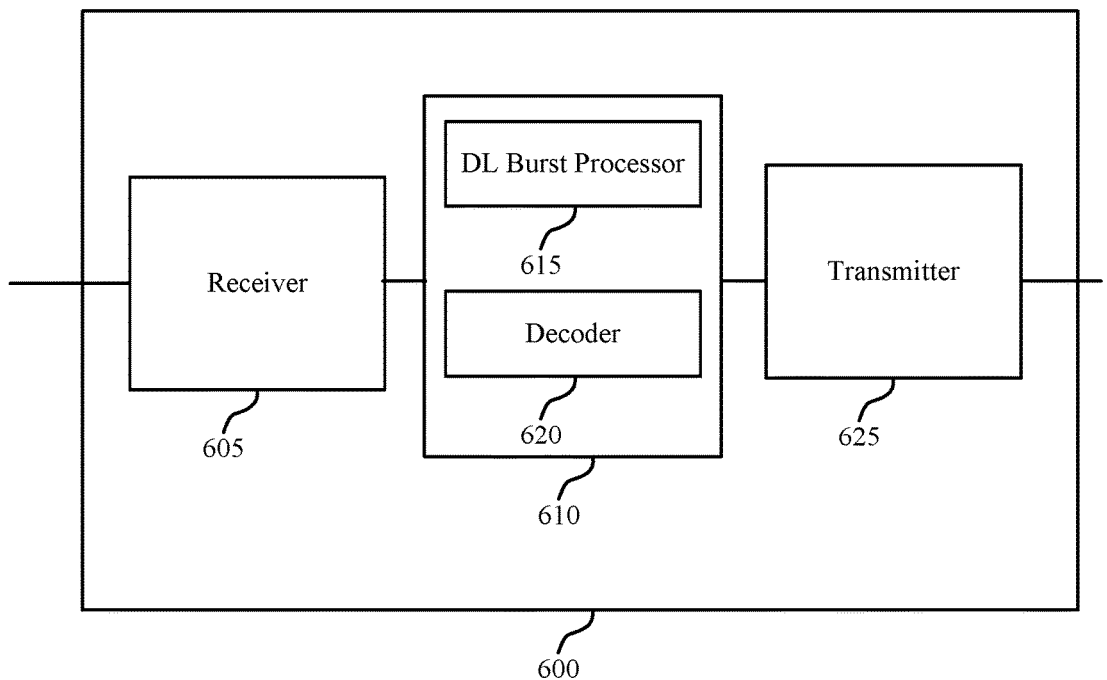

FIG. 6 shows a diagram of a wireless device 600 that supports reiterated downlink grant design for multiple TTI grant support in eCC in accordance with various aspects of the present disclosure. The wireless device 600 may be an example of aspects of a wireless device 500 or a UE 115 described with reference to FIGS. 1-5. The wireless device 600 may include receiver 605, reiterated grant component 610, and transmitter 625. The wireless device 600 may also include a processor (not shown). Each of these components may be in communication with each other.

The receiver 605 may receive information which may be passed on to reiterated grant component 610, and to other components of wireless device 600. The receiver 605 may also perform the functions described with reference to the receiver 505 of FIG. 5.

The reiterated grant component 610 may be an example of aspects of reiterated grant component 510 described with reference to FIG. 5. The reiterated grant component 610 may include DL burst processor 615 and decoder 620.

The DL burst processor 615 may receive a first grant and a first data transmission during a first TTI of a DL burst (the first grant including control information for multiple TTIs of the DL burst), and receive a second grant and a second data transmission during a second TTI of the DL burst (the second grant also including the control information for the multiple TTIs of the DL burst). In some cases, the DL burst includes multiple consecutive TTIs and each of the plurality of consecutive TTIs of the DL burst has a same TTI length. In some cases, the control information includes modulation and coding scheme information, rank information, a precoding matrix indicator, a resource location, or any combination thereof.

The decoder 620 may decode the first data transmission and the second data transmission based at least in part on decoding the first grant or the second grant. In some cases, the decoding the first data transmission and the second data transmission includes decoding data symbols of the first data transmission from a buffer based at least in part on the second grant.

The transmitter 625 may transmit signals received from other components of the wireless device 600. The transmitter 625 may also perform the functions described with reference to the transmitter 515 of FIG. 5.

Figure 7:
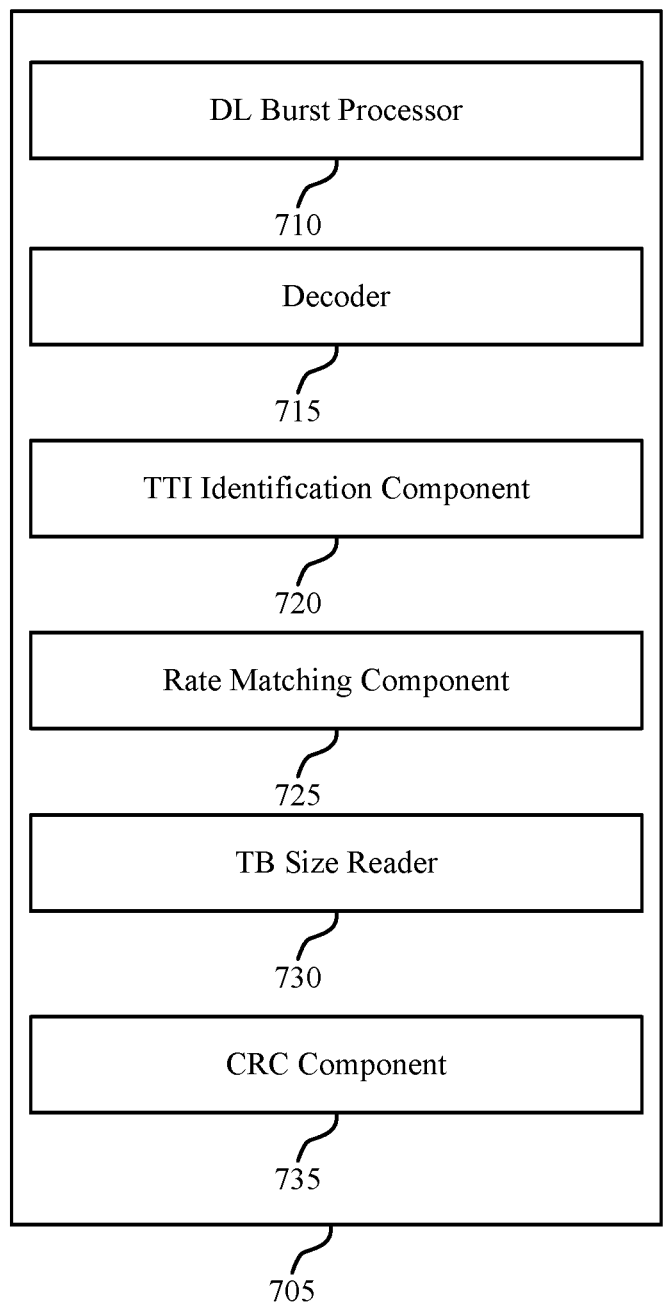

FIG. 7 shows a diagram of a reiterated grant component 705 which may be a component of a wireless device 500 or a wireless device 600 that supports reiterated downlink grant design for multiple TTI grant support in eCC in accordance with various aspects of the present disclosure. The reiterated grant component 705 may be an example of aspects of reiterated grant component 510 or reiterated grant component 610 described with reference to FIGS. 5 and 6. The reiterated grant component 705 may include DL burst processor 710, decoder 715, TTI identification component 720, rate matching component 725, TB size reader 730, and CRC component 735.

The DL burst processor 710 may receive a first grant and a first data transmission during a first TTI of a DL burst, the first grant including control information for multiple TTIs of the DL burst and receive a second grant and a second data transmission during a second TTI of the downlink burst, the second grant including the control information for the multiple TTIs of the DL burst. In some cases, the DL burst includes multiple consecutive TTIs and each of the plurality of consecutive TTIs of the DL burst has a same TTI length. In some cases, the control information includes modulation and coding scheme information, rank information, a precoding matrix indicator, a resource location, or any combination thereof.

The decoder 715 may decode the first data transmission and the second data transmission based at least in part on decoding the first grant or the second grant. In some cases, the decoding the first data transmission and the second data transmission includes decoding data symbols of the first data transmission from a buffer based at least in part on the second grant.

The TTI identification component 720 may identify a number of preceding TTIs and a number of subsequent TTIs in the DL burst based at least in part on the decoding of the first grant or the second grant. TTI identification component 720 may also identify a set of TTIs for a DL burst. In some cases, each TTI of the DL burst includes a grant for the DL burst and a data transmission of the DL burst. In some cases, each TTI of the DL burst includes multiple subframes. In some cases, each TTI of the DL burst is associated with a same hybrid automatic repeat request (HARQ) process.

The rate matching component 725 may determine a number of control symbols for the first data transmission or the second data transmission (e.g., since the number of control symbols may be different from the nominal number of control symbols) and may rate match the first data transmission or the second data transmission based at least in part on the number of control symbols.

The TB size reader 730 may identify a nominal number of control symbols for the DL burst and determine a partial transport block group size of the first data transmission and the second data transmission based at least in part on a number of TTIs of the DL burst and the nominal number of control symbols.

The CRC component 735 may perform a cyclic redundancy check on the first grant and determine whether the first grant has been decoded successfully based at least in part on the cyclic redundancy check. The CRC component 735 may also determine that an initial portion of the DL burst has not been decoded based at least in part on the number of preceding TTIs.

The functions of the components of wireless devices 500 or 600 including the reiterated grant component 705 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the wireless devices 500 or 600 may, individually or collectively, be implemented in hardware circuitry using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 8:
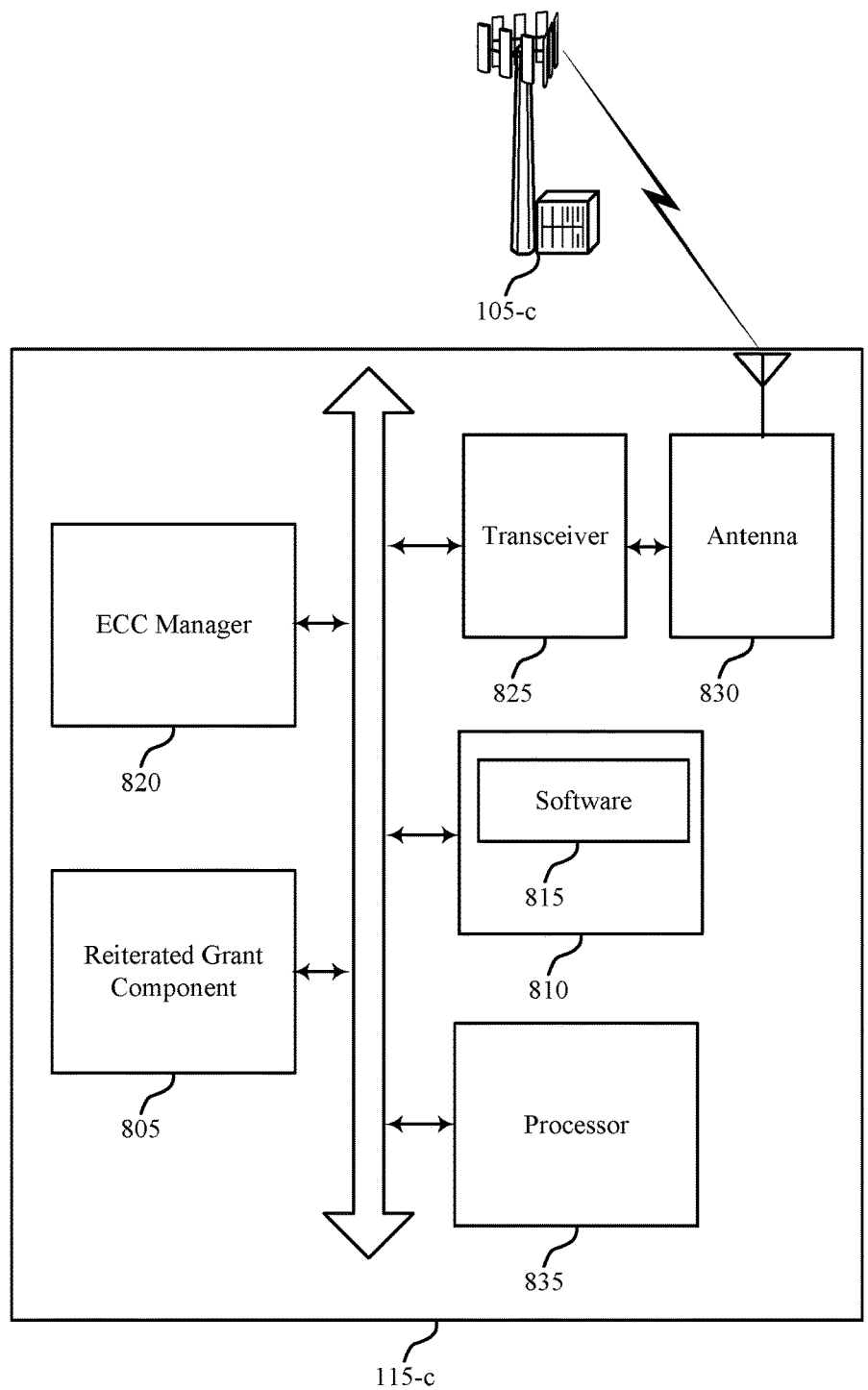
FIG. 8 illustrates a diagram of a system including a UE that supports reiterated downlink grant design for multiple TTI grant support in eCC in accordance with aspects of the present disclosure.

FIG. 8 shows a diagram of a system 800 including a device that supports reiterated downlink grant design for multiple TTI grant support in eCC in accordance with various aspects of the present disclosure. For example, system 800 may include UE 115-c, which may be an example of a wireless device 500, a wireless device 600, or a UE 115 as described with reference to FIGS. 1, 2 and 5-7.

UE 115-c may include reiterated grant component 805, memory 810, eCC manager 820, transceiver 825, antenna 830, and processor 835. Each of these components may communicate, directly or indirectly, with one another (e.g., via one or more buses). The reiterated grant component 805 may be an example of a reiterated grant component described with reference to FIGS. 5-7.

The eCC manager 820 may enable operation using eCCs such as those using shared or unlicensed spectrum (e.g., configuration of flexible bandwidth, variable length TTIs, etc.). The memory 810 may include random access memory (RAM) and read only memory (ROM). The memory 810 may store computer-readable, computer-executable software 815 including instructions that, when executed, cause the processor 835 to perform various functions described herein (e.g., reiterated downlink grant design for multiple TTI grant support in eCC, etc.). Alternatively, the software 815 may not be directly executable by the processor 835 but may cause a computer (e.g., when compiled and executed) to perform functions described herein. The eCC manager 820 may enable eCC operation including operations involving alternative TTI and subframe lengths (e.g., shorter TTIs or subframes to reduce latency).

The transceiver 825 may communicate bi-directionally, via the antenna 830, wired, or wireless links, with one or more networks, as described above. For example, the transceiver 825 may communicate bi-directionally with a base station 105-c or another UE 115. The transceiver 825 may include a modem to modulate the packets and provide the modulated packets to the antenna 830 for transmission, and to demodulate packets received from the antenna 830. In some cases, UE 115-c may include a single antenna 830, UE 115-c may also have more than one antenna 830 capable of concurrently transmitting or receiving multiple wireless transmissions. The processor 835 may include an intelligent hardware device, (e.g., a central processing unit (CPU), a microcontroller, an application specific integrated circuit (ASIC), etc.).

Figure 9:
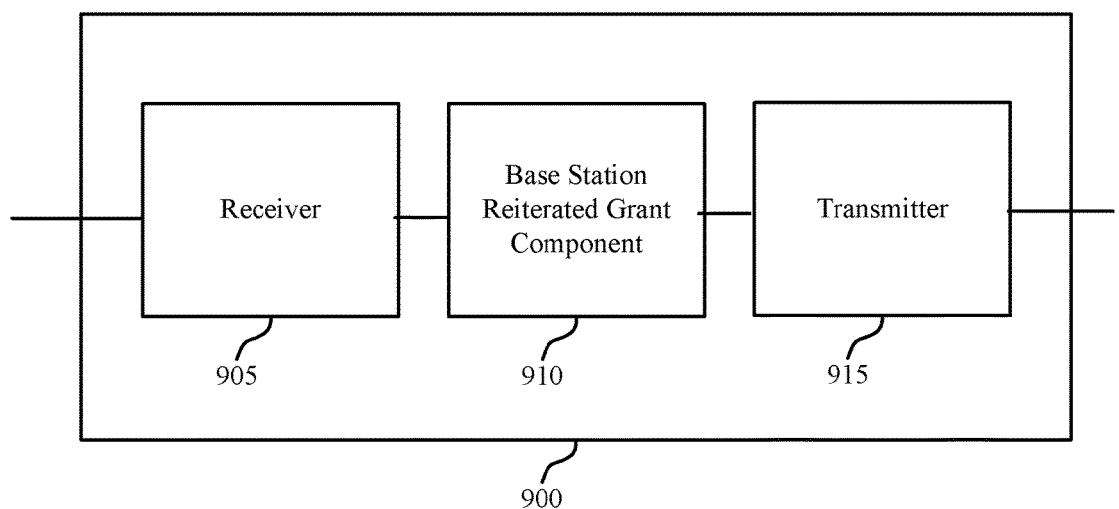
FIGS. 9-11 show diagrams of a wireless device that supports reiterated downlink grant design for multiple TTI grant support in eCC in accordance with aspects of the present disclosure.

FIG. 9 shows a diagram of a wireless device 900 configured for support of reiterated downlink grant design for multiple TTI grant support in eCC in accordance with various aspects of the present disclosure. The wireless device 900 may be an example of aspects of a base station 105 described with reference to FIGS. 1-4. The wireless device 500 may include a receiver 905, a base station reiterated grant component 910, and a transmitter 915. The wireless device 900 may also include a processor. Each of these components may be in communication with each other.

The receiver 905 may receive information such as packets, user data, or control information associated with various information channels (e.g., control channels, data channels, and information related to reiterated downlink grant design for multiple TTI grant support in eCC, etc.). Information may be passed on to the base station reiterated grant component 910, and to other components of wireless device 900.

The base station reiterated grant component 910 may identify a set of TTIs for a DL burst, transmit a first grant and a first data transmission during a first transmission time interval of the set of TTIs (the first grant including control information for multiple TTIs of the DL burst), and transmit a second grant and a second data transmission during a second transmission time interval of the set of TTIs (the second grant also including the control information for the multiple TTIs of the DL burst).

The transmitter 915 may transmit signals received from other components of wireless device 900. In some examples, the transmitter 915 may be collocated with the receiver 905 in a transceiver component. The transmitter 915 may include a single antenna, or it may include multiple antennas.

Figure 10:
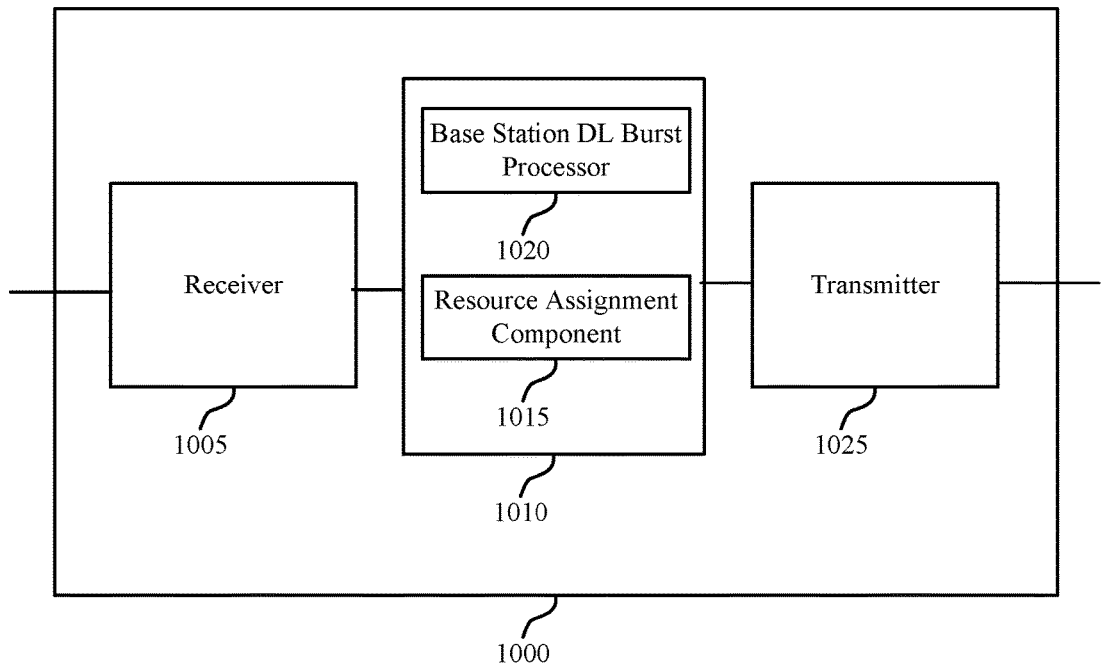

FIG. 10 shows a diagram of a wireless device 1000 that supports reiterated downlink grant design for multiple TTI grant support in eCC in accordance with various aspects of the present disclosure. The wireless device 1000 may be an example of aspects of a wireless device 900 or a base station 105 described with reference to FIGS. 1-5. The wireless device 1000 may include a receiver 1005, base station reiterated grant component 1010, or a transmitter 1025. The wireless device 1000 may also include a processor (not shown). Each of these components may be in communication with each other.

The receiver 1005 may receive information which may be passed on to base station reiterated grant component 1010, and to other components of wireless device 1000. The receiver 1005 may also perform the other functions described with reference to the receiver 905 of FIG. 9. The base station reiterated grant component 1010 may be an example of aspects of base station reiterated grant component 910 described with reference to FIG. 5. The base station reiterated grant component 1010 may include resource assignment component 1015 and base station DL burst processor 1020.

The resource assignment component 1015 may identify a set of TTIs for a downlink burst. The base station DL burst processor 1020 may cause the transmitter 1025 to transmit a first grant and a first data transmission during a first TTI of the set of TTIs (the first grant including control information for TTIs of the downlink burst) and may also transmit a second grant and a second data transmission during a second TTI of the set of TTIs (the second grant also including the control information). In some cases, the base station DL burst processor 1020 may cause the transmitter 1025 to transmit a data transmission during a TTI of the DL burst without a grant. In some cases, the first grant and the second grant each include an indication of a number of preceding TTIs and a number of subsequent TTIs in the DL burst. In some cases, the DL burst includes multiple consecutive TTIs and each of the multiple consecutive TTIs of the DL burst has a same TTI length.

In some cases, each of the set of TTIs of the DL burst includes a grant and a data transmission. In some cases, fewer than all TTIs of the DL burst include a grant. In some cases, each of the set of TTIs of the DL burst includes multiple subframes. In some cases, the multiple subframes have a first subframe duration that is shorter than a second subframe duration, such that the first subframe duration and the second subframe duration are supported by a same wireless network (e.g., the network may support low latency subframes or TTIs). In some cases, each data transmission of the set of TTIs of the DL burst is associated with a same HARQ process. In some cases, the control information includes modulation and coding scheme information, rank information, a precoding matrix indicator, a resource location, or any combination thereof.

The transmitter 1025 may transmit signals received from other components of the wireless device 1000. The transmitter 1025 may also perform the other functions described with reference to the transmitter 915 of FIG. 9.

Figure 11:
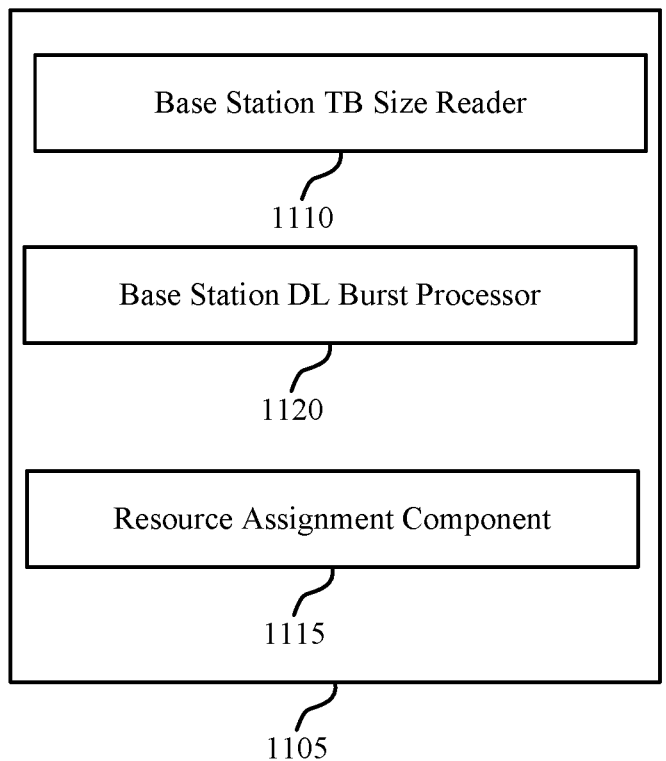

FIG. 11 shows a diagram of a base station reiterated grant component 1105 which may be a component of a wireless device 900 or a wireless device 1000, and may support reiterated downlink grant design for multiple TTI grant support in eCC in accordance with various aspects of the present disclosure. The base station reiterated grant component 1105 may be an example of aspects of base station reiterated grant component 910 or base station reiterated grant component 1010 described with reference to FIGS. 9 and 10. The base station reiterated grant component 1105 may include base station TB size reader 1110, resource assignment component 1115 and base station DL burst processor 1120.

The base station TB size reader 1110 may identify a partial transport block group size based at least in part on a nominal number of control symbols, determine that a set of resources for a code block retransmission overlaps multiple TTIs based at least in part on the partial transport block group size, adjust the partial transport block group size based at least in part on the determination and transmit the code block retransmission within a single TTI based at least in part on the adjusted partial transport block group size.

The resource assignment component 1115 may identify a set of TTIs for a DL burst. The base station DL burst processor 1120 may cause a transmitter to transmit a first grant and a first data transmission during a first TTI of the set of TTIs, the first grant including control information for multiple TTIs of the DL burst and transmit a second grant and a second data transmission during a second TTI of the set of TTIs, the second grant including the control information for the multiple TTIs of the DL burst.

The functions of the components of wireless devices 900 or 1000 including the base station reiterated grant component 1105 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the wireless devices 900 or 1000 may, individually or collectively, be implemented in hardware circuitry using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 12:
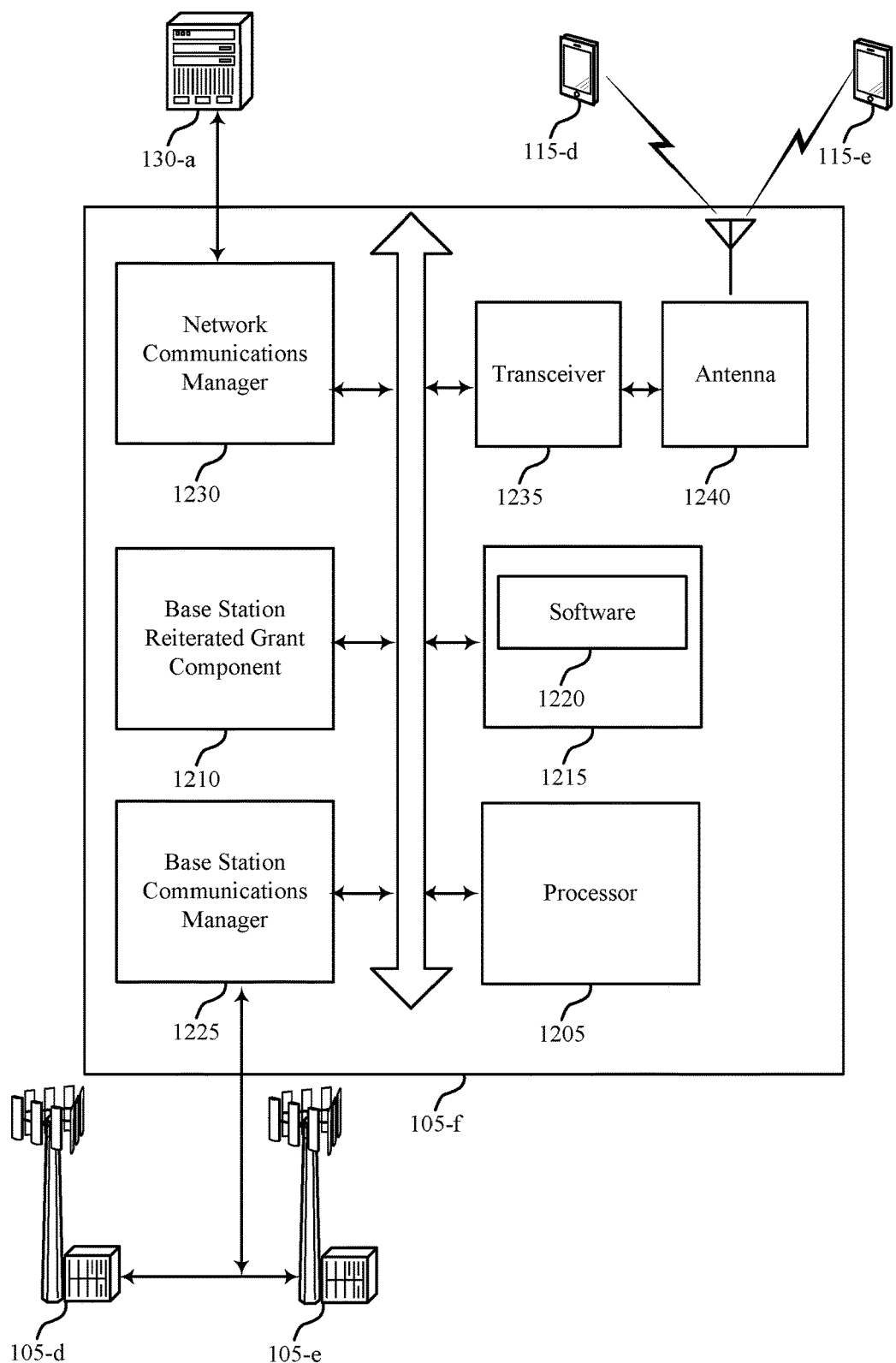
FIG. 12 illustrates a diagram of a system including a base station that supports reiterated downlink grant design for multiple TTI grant support in eCC in accordance with aspects of the present disclosure.

FIG. 12 shows a diagram of a wireless system 1200 including a device that supports reiterated downlink grant design for multiple TTI grant support in eCC in accordance with various aspects of the present disclosure. For example, system 1200 may include base station 105-f, which may be an example of a wireless device 900, a wireless device 1000, or a base station 105 as described with reference to FIGS. 1, 2 and 9-11. Base station 105-f may also include components for bi-directional voice and data communications including components for transmitting communications and components for receiving communications. For example, base station 105-f may communicate bi-directionally with UE 115-d and UE 115-e.

Base station 105-f may include processor 1205, base station reiterated grant component 1210, memory 1215, base station communications manager 1225, network communications manager 1230, transceiver 1235, and antenna 1240. Each of these components may be in communication with one another, directly or indirectly, with one another (e.g., over bus system 1245).

The processor 1205 may include an intelligent hardware device, e.g., a CPU, a microcontroller, an ASIC, etc. The processor 1205 may include various special purpose processors such as encoders, queue processing components, base band processors, radio head controllers, a digital signal processor (DSP), and the like. The base station reiterated grant component 1210 may be an example of a reiterated grant component described with reference to FIGS. 9-11.

The memory 1215 may include RAM and ROM. The memory 1215 may also store computer-readable, computer-executable software 1220 containing instructions that are configured to, when executed, cause the processor 1205 to perform various functions described herein (e.g., reiterated downlink grant design for multiple TTI grant support in eCC, selecting coverage enhancement (CE) techniques, call processing, database management, message routing, etc.). Alternatively, the software 1220 may not be directly executable by the processor 1205 but be configured to cause the computer, e.g., when compiled and executed, to perform functions described herein.

The base station communications manager 1225 may manage communications with other base station 105, and may include a controller or scheduler for controlling communications with UEs 115 in cooperation with other base stations 105. For example, the base station communications manager 1225 may coordinate scheduling for transmissions to UEs 115 for various interference mitigation techniques such as beamforming or joint transmission. In some cases, base station 105-f may communicate with other base stations 105 such as base station 105-e or base station 105-a utilizing base station communications manager 1225. In some examples, base station communications manager 1225 may provide an X2 interface within an LTE/LTE-A wireless communication network technology to provide communication between base stations 105.

The network communications manager 1230 may manage communications with core network 130-a. In some cases, base station 105-f may have one or more wired backhaul links via which base station 105-f may communicate with core network 130-a utilizing network communications manager 1230.

Figure 13:
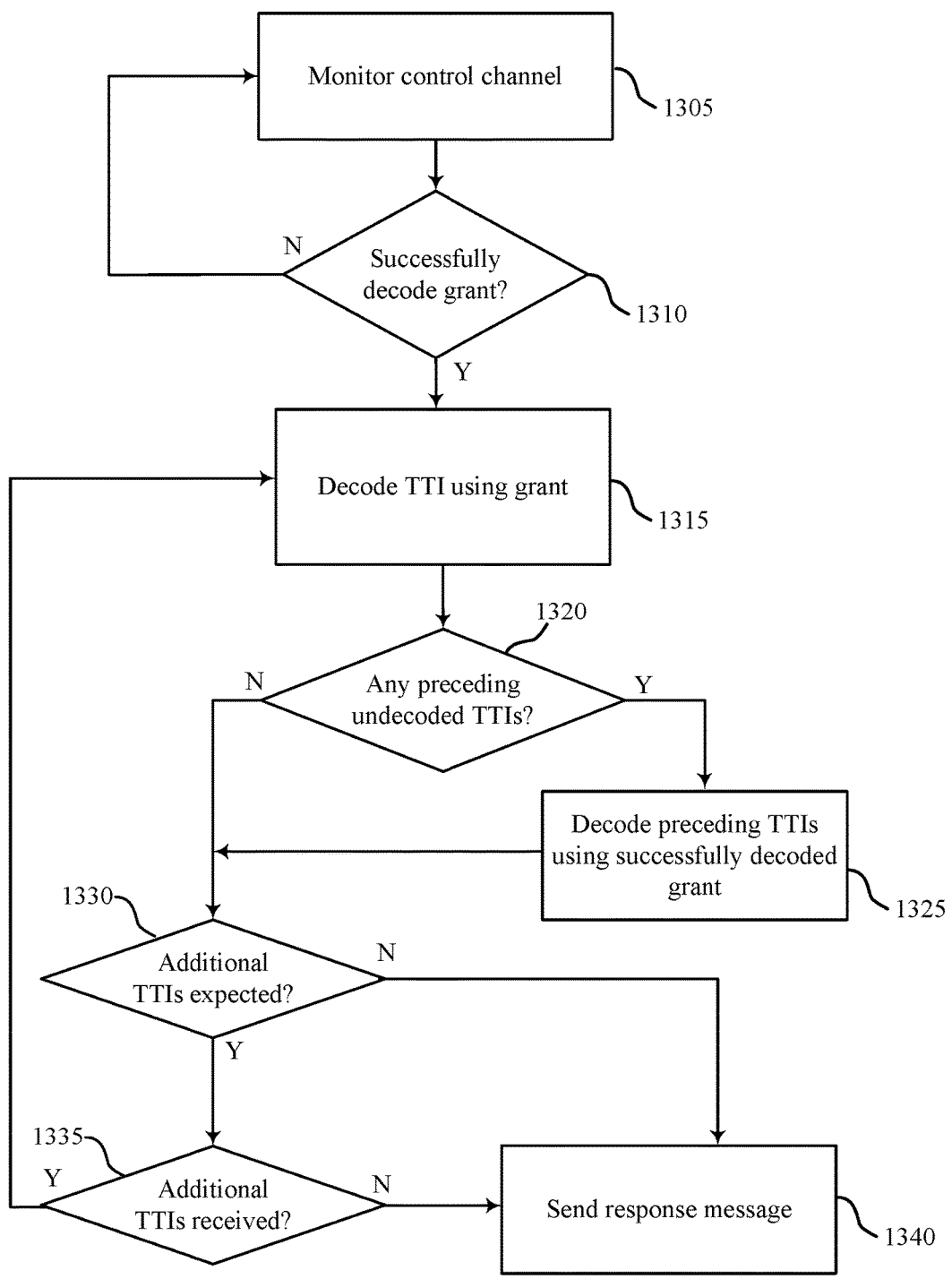
FIGS. 13-15 illustrate methods that support reiterated downlink grant design for multiple TTI grant support in eCC in accordance with aspects of the present disclosure.

FIG. 13 shows a flowchart illustrating a method 1300 that supports reiterated downlink grant design for multiple TTI grant support in eCC in accordance with various aspects of the present disclosure. The operations of method 1300 may be implemented by a UE 115 or its components as described with reference to FIGS. 1-12. For example, the operations of method 1300 may be performed by the UE reiterated grant component as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may monitor a control channel for a DL burst. For example, the UE 115 may monitor a control channel (e.g., PDCCH, ePDCCH, etc.) for grants associated with a DL burst sent by a base station 105. The UE 115 may attempt to decode DCI messages on the control channel by performing a blind decode, during which decode attempts are performed on search spaces until a valid DCI message is detected. During a blind decode, the UE 115 may attempt to descramble and decode (e.g., perform CRC) on all potential DCI messages using its C-RNTI, and a correctly decoded DCI message (e.g., CRC passes) is determined to include DCI for the UE 115.

At block 1310, the UE 115 may determine whether it could successfully decode a DCI including a grant. In an example, the UE 115-b may determine whether a received DCI passes CRC. If unsuccessful, the method may return to block 1305. If successful, the method may proceed to block 1315. At block 1315, the UE 115 may decode a data transmission of the TTI corresponding to the decoded grant. The decoded grant, for example, may indicate which resources (e.g., RBs) of a set of TTIs of the DL burst carry data transmissions for the UE and which do not (and hence can be ignored).

At block 1320, the UE 115 may process an indicator of the grant for determining whether there are any preceding undecoded TTIs that have been buffered. For example, each grant may have an indicator that indicates the number of preceding and subsequent TTIs of the DL burst. If yes, the method may proceed to block 1325 and decode the one or more preceding buffered TTIs using the grant and then proceed to block 1330. If not, the method may proceed to block 1330.

At block 1330, the UE 115 may determine whether any additional TTIs are expected in the DL burst. As above, each grant may indicate the number of subsequent TTIs in the DL burst. If additional TTIs are expected, the method may proceed to block 1335. If no additional TTIs are expected, the method may proceed to block 1340.

At block 1335, the UE 115 may receive and process additional TTIs of the DL burst. If received, the method may return to block 1315 to decode the one or more additional TTIs. If no additional TTIs are received within a predetermined amount of time, the method may proceed to block 1340. Although the UE 115 may already have the control information associated with all TTIs of the DL burst from block 1310, the UE 115 may process any additional grants detected in the additional TTIs to confirm the DL burst control information.

At block 1340, the UE 115 may generate and send a response message to the base station 105. The response message may include ACK/NACK information indicating whether the data transmissions of the DL burst were successfully decoded as described above. The ACK/NACK information may include, for example, an ACK/NACK for each code block of the DL burst.

Figure 14:
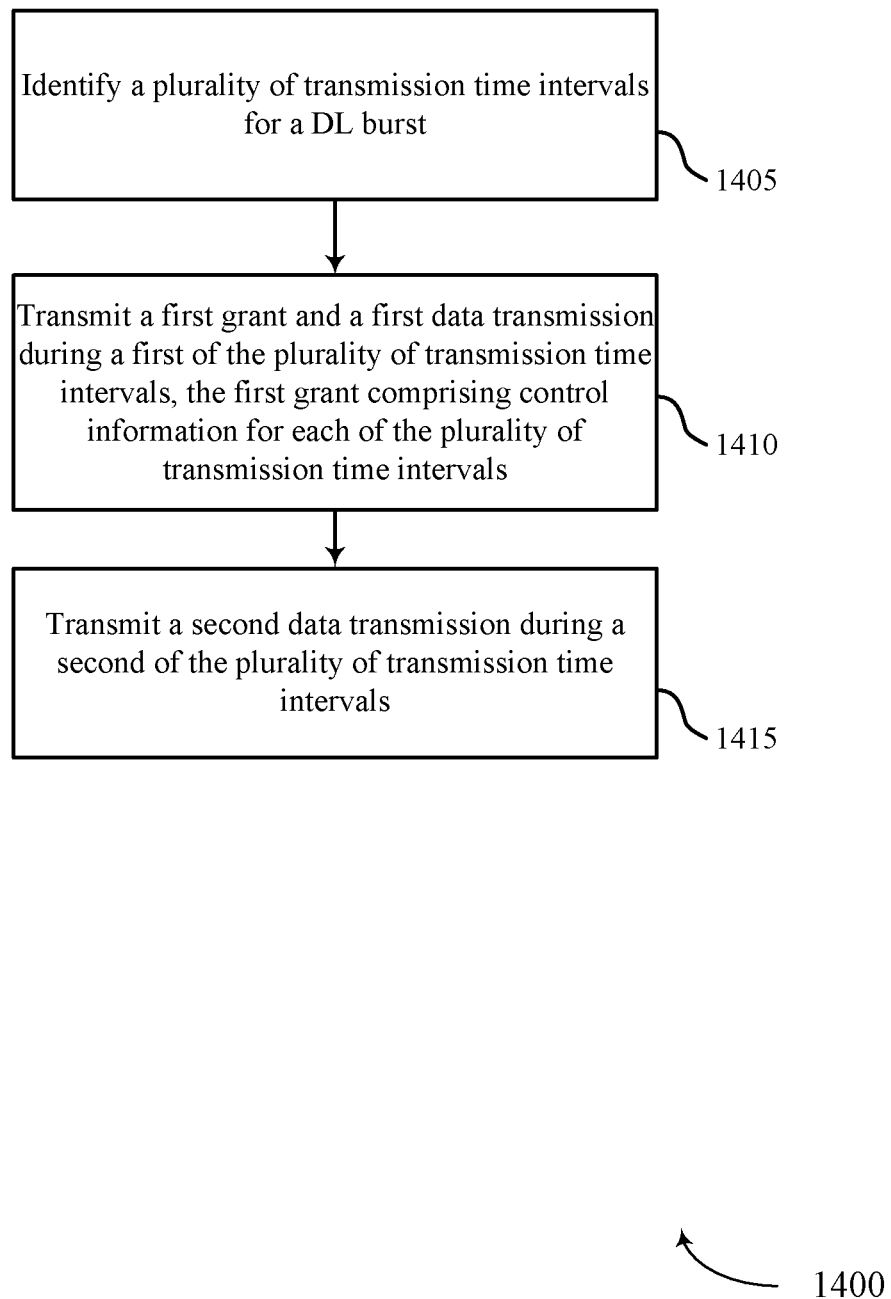

FIG. 14 shows a flowchart illustrating a method 1400 that supports reiterated downlink grant design for multiple TTI grant support in eCC in accordance with various aspects of the present disclosure. The operations of method 1400 may be implemented by a base station 105 or its components as described with reference to FIGS. 1-12. For example, the operations of method 1400 may be performed by the base station reiterated grant component as described herein. In some examples, the base station 105 may execute a set of codes to control the functional elements of the device to perform the functions described below. Additionally or alternatively, the base station 105 may perform aspects the functions described below using special-purpose hardware.

At block 1405, the base station 105 may identify multiple TTIs for a DL burst to a UE 115 as described above. At block 1410, the base station 105 may transmit, via a carrier transmission, a first grant and a first data transmission during a first of multiple TTIs, the first grant including control information for each of the multiple TTIs of the DL burst as described above. At block 1415, the base station 105 may transmit a second data transmission during a second of the multiple TTIs, as described above.

Figure 15:
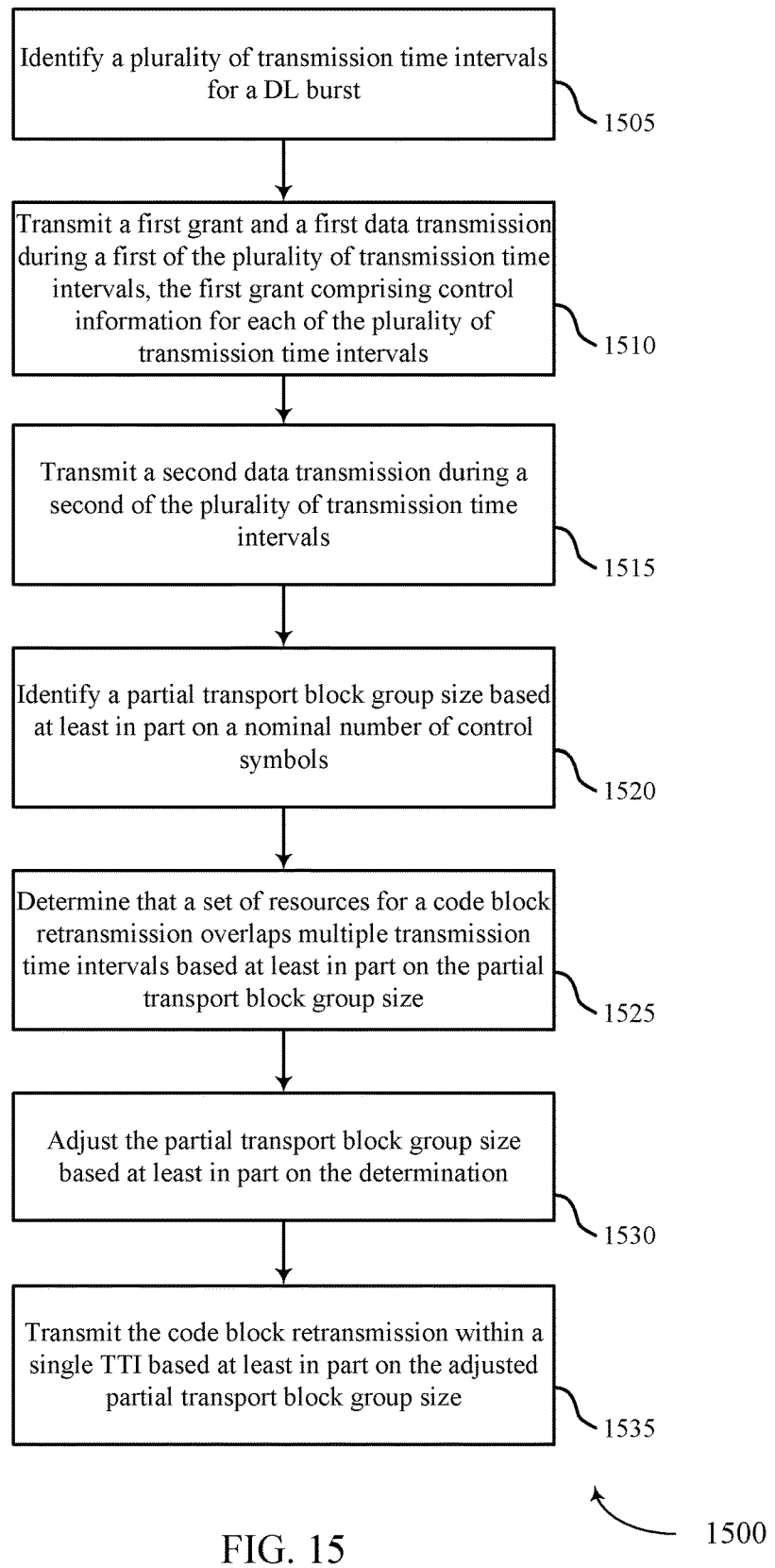

FIG. 15 shows a flowchart illustrating a method 1500 that supports reiterated downlink grant design for multiple TTI grant support in eCC in accordance with various aspects of the present disclosure. The operations of method 1500 may be implemented by a base station 105 or its components as described with reference to FIGS. 1-12. For example, the operations of method 1500 may be performed by the base station reiterated grant component as described herein. In some examples, the base station 105 may execute a set of codes to control the functional elements of the device to perform the functions described below. Additionally or alternatively, the base station 105 may perform aspects the functions described below using special-purpose hardware.

At block 1505, the base station 105 may identify multiple TTIs for a DL burst as described above. At block 1510, the base station 105 may transmit, via a carrier transmission, a first grant and a first data transmission during a first TTI of the multiple TTIs, the first grant including control information for each of the multiple TTIs of the DL burst as described above. At block 1515, the base station 105 may transmit a second data transmission during a second of the multiple TTIs, as described above.

At block 1520, the base station 105 may identify a partial transport block group size based at least in part on a nominal number of control symbols as described above. At block 1525, the base station 105 may determine that a set of resources for a code block retransmission overlaps multiple TTIs based at least in part on the partial transport block group size as described above.

At block 1530, the base station 105 may adjust the partial transport block group size based at least in part on the determination as described above. At block 1535, the base station 105 may transmit the code block retransmission within a single TTI based at least in part on the adjusted partial transport block group size as described above.

Thus, methods 1300, 1400, and 1500 may provide that supports reiterated downlink grant design for multiple TTI grant support in eCC. It should be noted that methods 1300, 1400, and 1500 describe possible implementations, and that the operations and the steps may be rearranged or otherwise modified such that other implementations are possible. In some examples, aspects from two or more of the methods 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a processor or circuitry including a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication comprising:
receiving a first grant and a first data transmission during a first transmission time interval of a plurality of transmission time intervals of a downlink burst, the first grant comprising control information for each transmission time interval of the plurality of transmission time intervals and indicating a count of a number of preceding transmission time intervals and a count of a number of subsequent transmission time intervals in the downlink burst;
identifying that the count of the number of preceding transmission time intervals is greater than zero and the count of the number of subsequent transmission time intervals is greater than zero in the downlink burst based at least in part on decoding the first grant;
receiving a second data transmission during a second transmission time interval of the plurality of transmission time intervals; and
decoding the first data transmission and the second data transmission based at least in part on the decoding the first grant.

2. The method of claim 1, further comprising:
determining that a preceding one of the plurality of transmission time intervals has not been decoded based at least in part on the count of the number of preceding transmission time intervals; and
transmitting a negative acknowledgement (NACK) corresponding to the preceding transmission time interval.

3. The method of claim 1, further comprising:
receiving a second grant during the second transmission time interval;

performing a cyclic redundancy check (CRC) on the second grant; and determining that the second grant has not been decoded successfully based at least in part on the CRC.

4. The method of claim 3, wherein decoding the first data transmission and the second data transmission based at least in part on decoding the first grant further comprises:

decoding data symbols of the second data transmission stored in a buffer based at least in part on the first grant.

5. The method of claim 1, wherein the plurality of transmission time intervals are consecutive and each have a same transmission time interval length.

6. The method of claim 1, further comprising:

receiving a second grant during the second transmission time interval, the second grant comprising the control information.

7. The method of claim 1, further comprising:

determining that a grant was not received during the second transmission time interval.

8. The method of claim 1, wherein each of the plurality of transmission time intervals comprises a plurality of subframes.

9. The method of claim 1, wherein each of the plurality of transmission time intervals is associated with a same hybrid automatic repeat request (HARQ) process.

10. The method of claim 1, wherein the control information comprises modulation and coding scheme information, rank information, a precoding matrix indicator, a resource location, or any combination thereof.

11. A method of wireless communication comprising:

identifying a plurality of transmission time intervals for a downlink burst;

transmitting a first grant and a first data transmission during a first transmission time interval of the plurality of transmission time intervals, the first grant comprising control information for each transmission time interval of the plurality of transmission time intervals and indicating a count of a number of preceding transmission time intervals and a count of a number of subsequent transmission time intervals in the downlink burst, wherein the count of the number of preceding transmission time intervals is greater than zero and the count of the number of subsequent transmission time intervals is greater than zero in the downlink burst; and transmitting a second data transmission during a second transmission time interval of the plurality of transmission time intervals.

12. The method of claim 11, wherein the plurality of transmission time intervals are consecutive and each have a same transmission time interval length.

13. The method of claim 11, further comprising:

transmitting a second grant during the second transmission time interval, the second grant comprising the control information.

14. The method of claim 11, further comprising:

determining not to transmit a grant during the second transmission time interval.

15. The method of claim 11, wherein each of the plurality of transmission time intervals comprises a plurality of subframes, wherein the plurality of subframes have a first subframe duration that is shorter than a second subframe duration, and wherein the first subframe duration and the second subframe duration are supported by a same wireless network.

16. The method of claim 11, wherein each data transmission of the plurality of transmission time intervals is associated with a same hybrid automatic repeat request (HARQ) process.

17. An apparatus for wireless communication, comprising:

a processor; and memory, in communication with the processor, storing instructions that, when executed by the processor, cause the apparatus to:

receive a first grant and a first data transmission during a first transmission time interval of a plurality of transmission time intervals of a downlink burst, the first grant comprising control information for each transmission time interval of the plurality of transmission time intervals and indicating a count of a number of preceding transmission time intervals and a count of a number of subsequent transmission time intervals in the downlink burst;

identify that the count of the number of preceding transmission time intervals is greater than zero and the count of the number of subsequent transmission time intervals is greater than zero in the downlink burst based at least in part on decoding the first grant;

receive a second data transmission during a second transmission time interval of the plurality of transmission time intervals; and decode the first data transmission and the second data transmission based at least in part on the decoding the first grant.

18. The apparatus of claim 17, wherein the instructions are operable to cause the processor to:

determine that a preceding one of the plurality of transmission time intervals has not been decoded based at least in part on the count of the number of preceding transmission time intervals; and transmit a negative acknowledgement (NACK) corresponding to the preceding transmission time interval.

19. The apparatus of claim 17, wherein the instructions are operable to cause the processor to:

receive a second grant during the second transmission time interval of the downlink burst;

perform a cyclic redundancy check (CRC) on the second grant; and determine that the second grant has not been decoded successfully based at least in part on the CRC.

20. The apparatus of claim 19, wherein decoding the first data transmission and the second data transmission based at least in part on decoding the first grant comprises:

decoding data symbols of the second data transmission stored in a buffer based at least in part on the first grant.

21. The apparatus of claim 17, wherein the plurality of transmission time intervals are consecutive and each have a same transmission time interval length.

22. The apparatus of claim 17, wherein the instructions are operable to cause the processor to receive a second grant during the second transmission time interval, the second grant comprising the control information.

23. The apparatus of claim 17, wherein the instructions are operable to cause the processor to determine that a grant was not received during the second transmission time interval.

24. The apparatus of claim 17, wherein each of the plurality of transmission time intervals is associated with a same hybrid automatic repeat request (HARQ) process.

25. An apparatus for wireless communication, comprising:

a processor; and memory, in communication with the processor, storing instructions that, when executed by the processor, cause the apparatus to:
- identify a plurality of transmission time intervals for a downlink burst;
- transmit a first grant and a first data transmission during a first transmission time interval of the plurality of transmission time intervals, the first grant comprising control information for each transmission time interval of the plurality of transmission time intervals and indicating a count of a number of preceding transmission time intervals and a count of a number of subsequent transmission time intervals in the downlink burst, wherein the count of the number of preceding transmission time intervals is greater than zero and the count of the number of subsequent transmission time intervals is greater than zero in the downlink burst; and
- transmit a second data transmission during a second transmission time interval of the plurality of transmission time intervals.

26. The apparatus of claim 25, wherein the instructions are operable to cause the processor to determine not to transmit a grant during the second transmission time interval.

* * * * *